United States Patent
Christoffersson et al.

(10) Patent No.: US 12,381,668 B2
(45) Date of Patent: Aug. 5, 2025

(54) RANDOM ACCESS RESOURCE CONFIGURATION IN DIFFERENT BANDWIDTH PARTS FOR TWO-STEP RANDOM ACCESS

(71) Applicant: Telefonaktiebolaget LM Ericsson (publ), Stockholm (SE)

(72) Inventors: Jan Christoffersson, Luleå (SE); Jonas Sedin, Sollentuna (SE); Johan Rune, Lidingö (SE); Henrik Enbuske, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 290 days.

(21) Appl. No.: 17/797,339

(22) PCT Filed: Feb. 12, 2021

(86) PCT No.: PCT/EP2021/053406
§ 371 (c)(1),
(2) Date: Aug. 3, 2022

(87) PCT Pub. No.: WO2021/160778
PCT Pub. Date: Aug. 19, 2021

(65) Prior Publication Data
US 2023/0068789 A1     Mar. 2, 2023

Related U.S. Application Data

(60) Provisional application No. 62/976,126, filed on Feb. 13, 2020.

(51) Int. Cl.
| H04W 74/08 | (2024.01) |
| H04L 5/00 | (2006.01) |
| H04W 72/044 | (2023.01) |
| H04W 74/0833 | (2024.01) |

(52) U.S. Cl.
CPC ......... *H04W 74/0833* (2013.01); *H04L 5/001* (2013.01); *H04L 5/0053* (2013.01); *H04W 72/044* (2013.01)

(58) Field of Classification Search
None
See application file for complete search history.

(56) References Cited

U.S. PATENT DOCUMENTS

2019/0104554 A1    4/2019   Amuru et al.

OTHER PUBLICATIONS

3GPP TSG RAN WG1 #99, FL Summary #5 of Channel Structure for 2-step RACH, R1-1913568, pp. 1-35, (Year: 2019).*

(Continued)

*Primary Examiner* — Kouroush Mohebbi
(74) *Attorney, Agent, or Firm* — COATS & BENNETT, PLLC

(57) ABSTRACT

Techniques are provided to enable use of more than two preamble group Bs during random access (RA) for connected UEs. This flexibility is achieved by configuring the active BWP to overlap with the 2-step RA resources on the initial BWP, configuring different sizes of preamble group B in the initial BWP and the active BWP, a allowing connected UEs in the active BWP to use the MsgA PRACH and MsgA PUSCH resources in the initial BWP without switching active BWP.

16 Claims, 32 Drawing Sheets

(56) References Cited

OTHER PUBLICATIONS

Huawei, et al., "Remaining issues for BWP", TSG-RAN2 Meeting #100, Reno, USA, Nov. 27-Dec. 1, 2017, pp. 1-4, R2-1712326, 3GPP.
Huawei, et al., BWP issues for EN-DC completion, 3GPP TSG-RAN WG2 Meeting #100, Reno, USA, Nov. 27-Dec. 1, 2017, R2-1712322.
ZTE, FL Summary #5 of Channel Structure for 2-step RACH, 3GPP TSG RAN WGI #99, Reno, USA, Nov. 18-22, 2019, R1-1913568.
OPPO, BWP switching due to LBT, 3GPP TSG-RAN WG2 Meeting #103bis, 2018 Chengdu, China, Oct. 8-12, 2018, R2-1813589, resubmission of R2-1811066.
Thales, Study on solutions evaluation for NR to support Non Terrestrial Network, 3GPP TSG RAN meeting #80, La Jolla, USA, Jun. 11-14, 2018, RP-181370.
ZTE Corporation, New work item: 2-step RACH for NR, 3GPP TSG RAN Meeting #82, Sorrento, Italy, Dec. 10-13, 2018, RP-182894.
3GPP TR 38.889, V16.0.0 (Dec. 2018), 3rd Generation Partnership Project; Technical Specification Group Radio Access Network; Study on NR-based access to unlicensed spectrum (Release 16).
3GPP TR 38.811, V15.2.0 (Sep. 2019), 3rd Generation Partnership Project; Technical Specification Group Radio Access Network; Study on New Radio (NR) to support non-terrestrial networks (Release 15).
3GPP TS 38.321 V15.8.0 (Dec. 2019), 3rd Generation Partnership Project; Technical Specification Group Radio Access Network; NR; Medium Access Control (MAC) protocol specification (Release 15).

\* cited by examiner

RANDOM ACCESS RESOURCE CONFIGURATION IN DIFFERENT BANDWIDTH PARTS FOR TWO-STEP RANDOM ACCESS

RELATED APPLICATIONS

The present application claims benefit of U.S. Provisional Application 62/976,126, which was filed Feb. 13, 2020, the disclosure of each of which is incorporated herein by reference in their entirety.

TECHNICAL FIELD

The present disclosure relates generally to 2-step, random access procedures and, more particularly, to the configuration of 2-step random access resources in different bandwidth parts for 2-step random access.

BACKGROUND

In Release 15 (Rel-15) of the New Radio (NR) standard for wireless communication networks, user equipments (UEs) use a 4-step random access procedures to establish a connection. After detecting synchronization signals (SS) and decoding the broadcasted system information (SI), the UE transmits a Physical Random Access Channel (PRACH) preamble, referred to as message 1 (msg1) in the uplink. The access node, also known as a base station, replies with a Random Access Response (RAR), also known as message 2 (msg2). The UE then transmits a UE identification in message 3 (msg3) on the Physical Uplink Shared Channel (PUSCH) using an uplink grant (i.e., allocation of uplink transmission resources).

The UE transmits message 3 (on PUSCH) after receiving a timing advance (TA) command in the RAR, allowing the PUSCH to be received with a timing accuracy within the cyclic prefix (CP). Without this timing advance, a very large CP would be needed in order to demodulate and detect the PUSCH, unless the system is applied in a cell with very small distance between the UE and access node. Because NR will also support larger cells with a need for providing a timing advance to the UE, the 4-step approach is needed for the random access procedure.

Rel-15 also introduced preamble grouping to allow the UE to signal to the network by means of PRACH preambles that it has a payload that is larger than a configured threshold. This indication is used by the network to schedule the UE with larger resources for msg3. The UE may request more resources only if the pathloss with the serving cell is lower than a configured threshold.

Within the Third Generation Partnership Project (3GPP), work is ongoing to develop a 2-step random access procedure for NR. In 2-step random access, the UE sends MsgA including random access preamble together with higher layer data, such as a Radio Resource Connection (RRC) request with a small payload on the PUSCH. The PUSCH in MsgA (generally referred to as "MsgA PUSCH") can be transmitted immediately after an associated PRACH preamble. MsgA PUSCH may be transmitted in time-frequency resource locations referred to as PUSCH occasions (PO). Upon receiving MsgA from the UE, the access node sends a response called MsgB, which may be described as a modified RAR, including a UE identifier assignment, timing advance information, and contention resolution message, fallback indication(s) to schedule msg3 transmission, back-off indication, etc. In addition, MsgB may contain a higher layer part. Similar to a RAR, a MsgB may contain responses to multiple msgAs, and thus to multiple UEs, but the optional higher layer part can only pertain to one of the responses (e.g., to one of the msgAs/UEs). If a response in a MsgB does not have an associated higher layer part, it will be sent in a subsequent message, e.g., an RRC message, on the Physical Downlink Shared Channel (PDSCH).

The use of bandwidth parts (BWPs) has been standardized in Rel-15 for NR. The reasons for using BWPs are that some UEs might not be able to use the entire bandwidth, in which case they are assigned a smaller BWP that they are capable of handling. Another reason is for battery savings. A UE may be assigned a narrower BWP to reduce the needed energy for reception and transmission. Yet another reason could be for load balancing when the UEs do not need the entire BW to meet the bit rate requirements.

Each UE is assigned at least an initial BWP (same for all UEs, narrow enough for all UEs to handle) and a default BWP. The default BWP may be the same as the initial BWP but may also be different (i.e., different UEs will typically have different default BWPs). In addition to initial and default BWPs, the UE can be configured with additional BWPs. It has been agreed that a UE can have up to four downlink (DL) and four uplink (UL) BWPs. The BWPs may be overlapping. Only one BWP is active for a specific UE at any given point in time.

The UE is configured with BWPs using RRC signaling (except the initial BWP which is signaled in the SIB) and switching between BWPs is done by DCI on the PDCCH. There is also a possibility to switch to the default BWP when the bwp-InactivityTimer expires or when Random Access is initiated if the active BWP does not have any RA resources.

A BWP may also be configured with PRACH occasions, allowing the UE to initiate a Random Access procedure on the BWP. The configuration of PRACH occasions on a BWP is not mandatory except on the initial BWP, where it is always present to allow initial access. Also, for the Physical Uplink Control Channel (PUCCH), a BWP may or may not have PUCCH resources configured. The reason for not having a PUCCH configured is that it occupies resources which will lead to overhead (especially in configured but not active BWPs).

Preamble grouping in 2-step random access works slightly differently compared to 4-step RA. The reason for this is that in 4-step random access, the preamble grouping allows the UE to signal to the network that it wants to be scheduled with a larger than normal UL grant, while in 2-step RA the MsgA PUSCH is already pre-configured and is not "scheduled". This means that there is a pre-configured association between the preamble group and the MsgA PUSCH configuration.

A problem with current solution is how to configure preamble group A and preamble group B for 2-step random access in an efficient way for RRC_CONNECTED UEs. According to current agreements, the UE can only use the 2-step RA resources on the active BWP (if configured). This restriction means that the UE can only be configured with one preamble group A and one preamble group B for 2-step RA. Thus, only 2 MsgA PUSCH sizes are available for MsgA transmission. There are conflicting options for sizing the PUSCH resources. The PUSCH resources can be tailored to common use cases (e.g., 24 bits for transmission of Cell Radio Network Temporary Identifier (C-RNTI) Medium Access Control (MAC) Element (CE) and short Buffer Status Report (BSR)). Alternatively, the PUSCH resources can be made as large as possible to support transmission of uplink data. A variation of this latter option is to make the PUSCH resources as large as possible but not so large that UEs with high pathloss cannot use the large size. These conflicting criteria make it difficult to meet the many different possible scenarios with only two sizes which are optimal.

SUMMARY

The present disclosure relates generally to preamble group configuration in different bandwidth parts for 2-step random access. Techniques are provided to enable use of more than two preamble group Bs for connected UEs. This flexibility is achieved by configuring the active BWP to overlap with the 2-step RA resources on the initial BWP, configuring different sizes of preamble group B in the initial BWP and the active BWP, and allowing connected UEs in the active BWP to use the MsgA PRACH and MsgA PUSCH resources in the initial BWP without switching active BWP. After transmitting MsgA, the MsgB reception is monitored on the active BWP regardless of the BWP used for MsgA transmission.

The configuration of preamble group B resources for the connected UE allows more flexibility for the UE to select an appropriately sized preamble group B. This flexibility allows for better resource utilization and greater efficiency in uplink (UL) transmissions of data with 2-step random access. The preamble group configuration for 2-step random access also makes it possible to use a BWP on a non-active BWP without requiring a BWP switch.

A first aspect of the disclosure comprises methods of 2-step random access implemented by a UE in a wireless communication network. In one embodiment, the method comprises initiating a 2-step random access procedure while in a connected mode in an active BWP, and transmitting a random access message to an access node on 2-step random access resources in an inactive BWP without changing the active BWP.

A second aspect of the disclosure comprises a UE configured to perform 2-step random access. In one embodiment, the UE is configured to initiate a 2-step random access procedure while in a connected mode in an active BWP, and to transmit a random access message to an access node on 2-step random access resources in an inactive BWP without changing the active BWP.

A third aspect of the disclosure comprises a UE configured to perform 2-step random access. In one embodiment, the UE comprises communication circuitry configured for communication with one or more access nodes in the wireless communication network and processing circuitry. The processing circuitry is configured to initiate a 2-step random access procedure while in a connected mode in an active BWP, and to transmit a random access message to an access node on 2-step random access resources in an inactive BWP without changing the active BWP.

A fourth aspect of the disclosure comprises computer programs executable by a UE for performing 2-step random access. In one embodiment, the computer program comprises executable instructions that, when executed by a processing circuit in a user equipment in a wireless communication network, causes the user equipment to perform the method according to the first aspect.

A fifth aspect of the disclosure comprises a carrier containing a computer program according to the fourth aspect, wherein the carrier is one of an electronic signal, optical signal, radio signal, or computer readable storage medium.

A sixth aspect of the disclosure comprises methods of 2-step random access implemented by a UE in a wireless communication network. In one embodiment, the method comprises initiating a 2-step random access procedure while in a connected mode in an active BWP, selecting 2-step random access resources from among first 2-step RA resources in an inactive BWP configured for the UE to use in both connected and idle/inactive modes and second 2-step RA resources in an active BWP overlapping the inactive BWP configured for the UE to use in connected mode, and transmitting a random access message in the inactive BWP without changing the active BWP.

A seventh aspect of the disclosure comprises a UE configured to perform 2-step random access. In one embodiment, the UE is configured to initiate a 2-step random access procedure while in a connected mode in an active BWP, select 2-step random access resources from among first 2-step RA resources in an inactive BWP configured for the UE to use in both connected and idle/inactive modes and second 2-step RA resources in an active BWP overlapping the inactive BWP configured for the UE to use in connected mode, and transmit a random access message in the inactive BWP without changing the active BWP.

An eighth aspect of the disclosure comprises a UE configured to perform 2-step random access. In one embodiment, the UE comprises communication circuitry configured for communication with one or more access nodes in the wireless communication network and processing circuitry. The processing circuitry is configured to initiate a 2-step random access procedure while in a connected mode in an active BWP, select 2-step random access resources from among first 2-step RA resources in an inactive BWP configured for the UE to use in both connected and idle/inactive modes and second 2-step RA resources in an active BWP overlapping the inactive BWP configured for the UE to use in connected mode, and transmit a random access message in the inactive BWP without changing the active BWP.

A ninth aspect of the disclosure comprises computer programs executable by a UE for performing 2-step random access. In one embodiment, the computer program comprises executable instructions that, when executed by a processing circuit in a user equipment in a wireless communication network, causes the user equipment to perform the method according to the sixth aspect.

A tenth aspect of the disclosure comprises a carrier containing a computer program according to the ninth aspect, wherein the carrier is one of an electronic signal, optical signal, radio signal, or computer readable storage medium.

An eleventh aspect of the disclosure comprises methods implemented by a network node in a wireless communication network of supporting 2-step random access. In one embodiment, the method comprises configuring 2-step random access resources for random access by the UE in connected mode including first 2-step random access resources in an inactive BWP for use in both connected and idle/inactive modes and second 2-step random access resources in an active BWP overlapping the inactive BWP configured for the UE to use in a connected mode.

A twelfth aspect of the disclosure comprises a network node in a wireless communication network configured to support 2-step random access. In one embodiment, the network node is operative to configure 2-step random access resources for random access by the UE in connected mode including first 2-step random access resources in an inactive BWP for use in both connected and idle/inactive modes and second 2-step random access resources in an active BWP overlapping the inactive BWP configured for the UE to use in a connected mode.

A thirteenth aspect of the disclosure comprises a network node in a wireless communication network configured to support 2-step random access. In one embodiment, the network node comprises communication circuitry enabling communication with other network nodes in the wireless communication network and processing circuitry. The processing circuitry is operative to configure 2-step random access resources for random access by the UE in connected mode including first 2-step random access resources in an inactive BWP for use in both connected and idle/inactive modes and second 2-step random access resources in an active BWP overlapping the inactive BWP configured for the UE to use in a connected mode.

A fourteenth aspect of the disclosure comprises computer programs executable by a network node for supporting 2-step random access. In one embodiment, the computer program comprises executable instructions that, when executed by a processing circuit in the network node in a wireless communication network, causes the network node to perform the method according to the eleventh aspect.

A fifteenth aspect of the disclosure comprises a carrier containing a computer program according to the fourteenth aspect, wherein the carrier is one of an electronic signal, optical signal, radio signal, or computer readable storage medium.

A sixteenth aspect of the disclosure comprises methods implemented by an access node in a wireless communication network of supporting 2-step random access. In one embodiment, the method comprises receiving, from a connected mode UE, a random access message transmitted on 2-step random access resources in an inactive BWP configured for the UE and transmitting, responsive to the random access message, a random access response.

A seventeenth aspect of the disclosure comprises an access node in a wireless communication network configured to receive, from a connected mode UE, a random access message transmitted on 2-step random access resources in an inactive BWP configured for the UE and transmit, responsive to the random access message, a random access response.

An eighteenth aspect of the disclosure comprises an access node in a wireless communication network configured to support 2-step random access. In one embodiment, the network node comprises communication circuitry enabling communication with other network nodes in the wireless communication network and processing circuitry. The processing circuitry is configured to receive, from a connected mode UE, a random access message transmitted on 2-step random access resources in an inactive BWP configured for the UE and transmit, responsive to the random access message, a random access response.

A nineteenth aspect of the disclosure comprises computer programs executable by an access node for supporting 2-step random access. In one embodiment, the computer program comprises executable instructions that, when executed by a processing circuit in an access node in a wireless communication network, causes the access node to perform the method according to the sixteenth aspect.

A twentieth aspect of the disclosure comprises a carrier containing a computer program according to the nineteenth aspect, wherein the carrier is one of an electronic signal, optical signal, radio signal, or computer readable storage medium.

DETAILED DESCRIPTION

Figure 1:
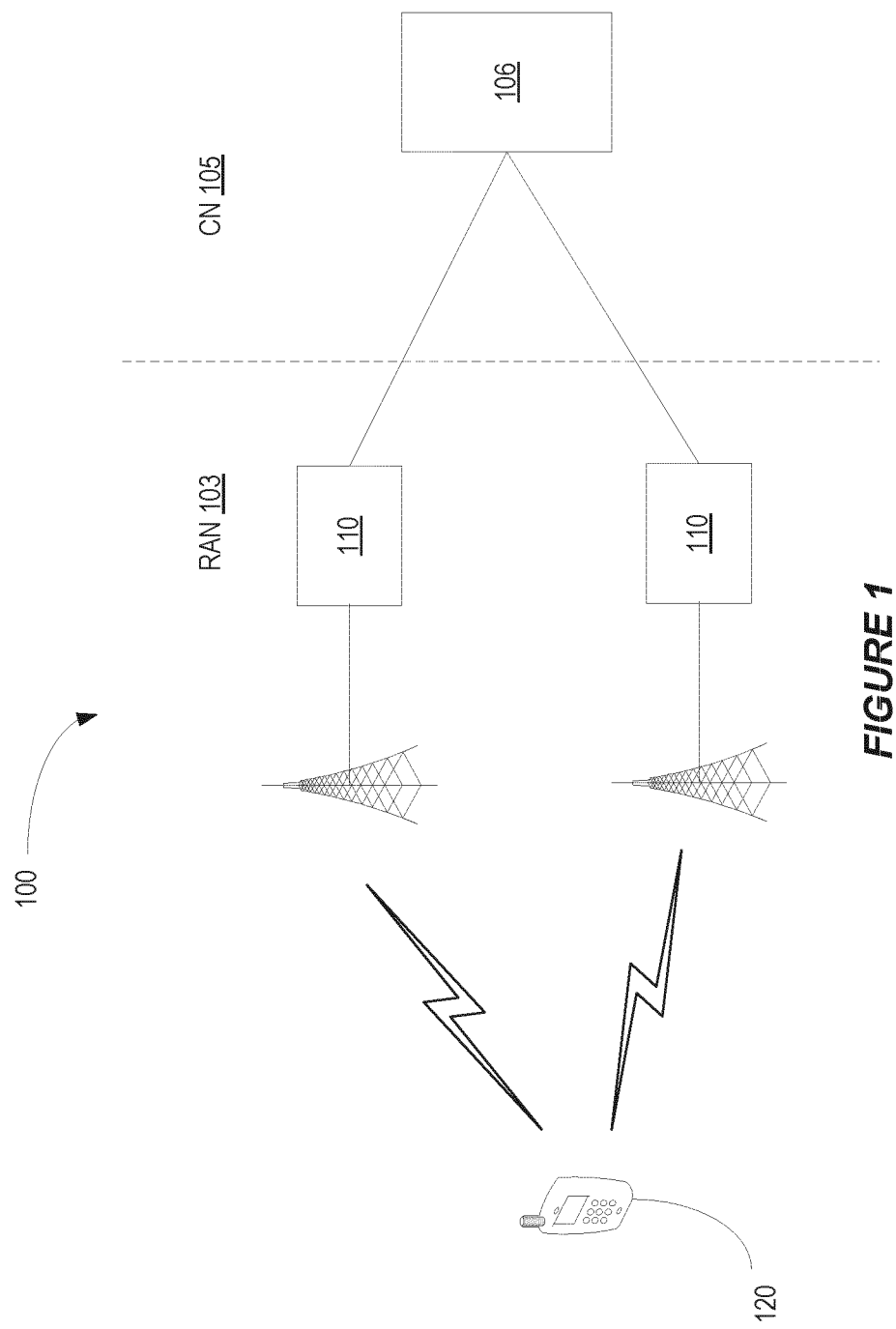
FIG. 1 illustrates an exemplary wireless communication network according to an embodiment.

Referring now to the drawings, an exemplary embodiment of the disclosure will be described in the context of a Fifth Generation (5G), also known as New Radio (NR), wireless communication network. Those skilled in the art will appreciate that the methods and apparatus herein described are not limited to use in 5G or NR networks, but may also be used in wireless communication networks 100 operating according to other standards to support contention-free random access procedures.

FIG. 1 illustrates a wireless communication network 100 according to the 5G standard currently being developed by Third Generation Partnership Project (3GPP). The wireless communication network 100 comprises a 5G radio access network (RAN) 103 and a 5G core network (5GC) 105. The 5G RAN 103 includes one or more access nodes 110 that communicate over the air interface with user equipment (UEs) 120 operating within the network 100. The access nodes 110 provide the UEs 120 with access to the 5GC 105.

For Fourth Generation (4G) networks, also known as Long Term Evolution (LTE) networks, such as specified in 3GPP TS 36.300 and related specifications, the access nodes 110 are referred to as Evolved NodeBs (eNBs). For Fifth Generation (5G) networks, the access nodes 110 are referred to as 5G NodeBs (gNBs) or Next Generation eNBs (ng-eNBs).

The UEs 120 may comprise any type of equipment capable of communicating with the access nodes 110 over a wireless communication channel. For example, the UEs 120 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Figure 2:
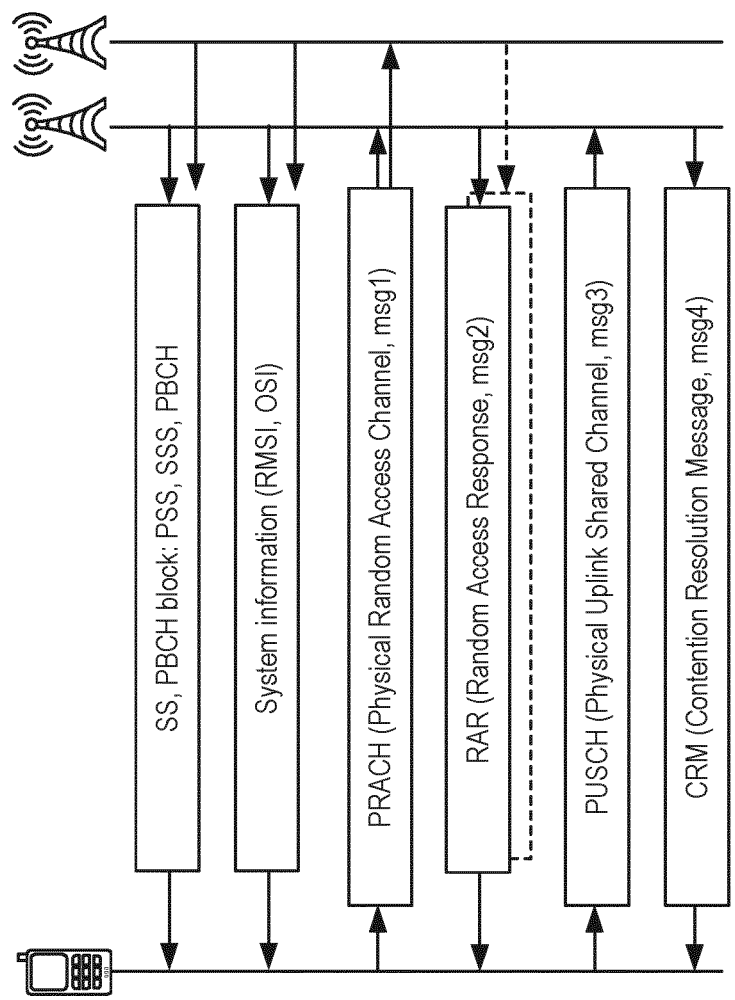
FIG. 2 illustrates a 4-step RA procedure.

In NR networks, a Random Access (RA) procedure is used by the UE 120 to access the network 100. An exemplary 4-step RA procedure is shown in FIG. 2. During the RA procedure, the UE 120 transmits a RA preamble on a Random Access Channel (RACH) or Physical Random Access Channel (PRACH) and the access node 110 responds with a Random Access Response (RAR) message providing the UE 120 with an uplink (UL) grant.

Figure 3:
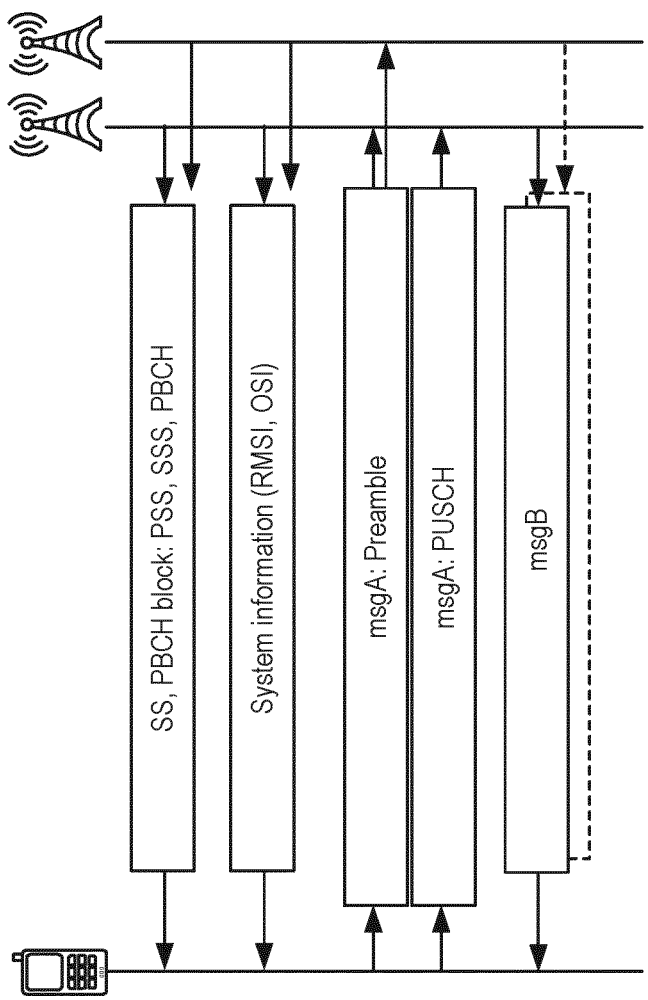
FIG. 3 illustrates a 2-step RA procedure.

Through Msg2 the network 100 provides the UE 120 with an UL grant for transmission of more information to the network 100, in a so called Msg3 (e.g., Connection Request message). Msg1 is, among other things, used by the network to determine a so-called Timing Advance (TA) value that the UE 120 should use in its uplink transmissions in order for them to reach the network's antenna at the right point in time, i.e., a point in time related to when the UE 120 receives downlink transmissions from the cell. This TA value is mainly dependent on the distance between the UE 120 and the access node/antenna, and the initial value to use is signaled to the UE 120 in Msg2, based on an estimate of the time of arrival of Msg1 (i.e., the PRACH preamble). 2-step RA modifies the regular 4-step RA procedure to enable faster access. An exemplary 2-step RA procedure is shown in FIG. 3. Essentially, the 2-step RA procedure lumps Message 1 (Msg1) and Message 3 (Msg3) of the standard 4-step procedure into a message, labelled Message A (MsgA) in a first step of the RA procedure. MsgA thus contains a RA preamble transmitted on PRACH transmission resources combined with a transmission of the remainder of MsgA (corresponding to Msg3) on PUSCH transmission resources. An association is made between the RA preamble and the PUSCH transmission resources to be used for the PUSCH part of MsgA. Such preamble-PUSCH resource associations could potentially be one-to-many, one-to-one or even one-to-many. The transmission of MsgA in the first step is followed by a second, concluding step comprising the transmission of a message, labelled Message B (MsgB) that combines Message 2 (Msg2) and Message 4 (Msg4) of the 4-step RA procedure.

When introducing the 2-step random access procedure, the PUSCH in MsgA (generally referred to as "MsgA PUSCH") can be transmitted immediately after an associated PRACH preamble. The MsgA PUSCH resources are cell-specifically reserved at least for the transmission of MsgA PUSCH in conjunction with initial access. MsgA PUSCH may be transmitted in time-frequency resource locations referred to as PUSCH occasions (PO), as is shown in FIG. 4A illustrates a PUSCH Occasion.

Figure 4:
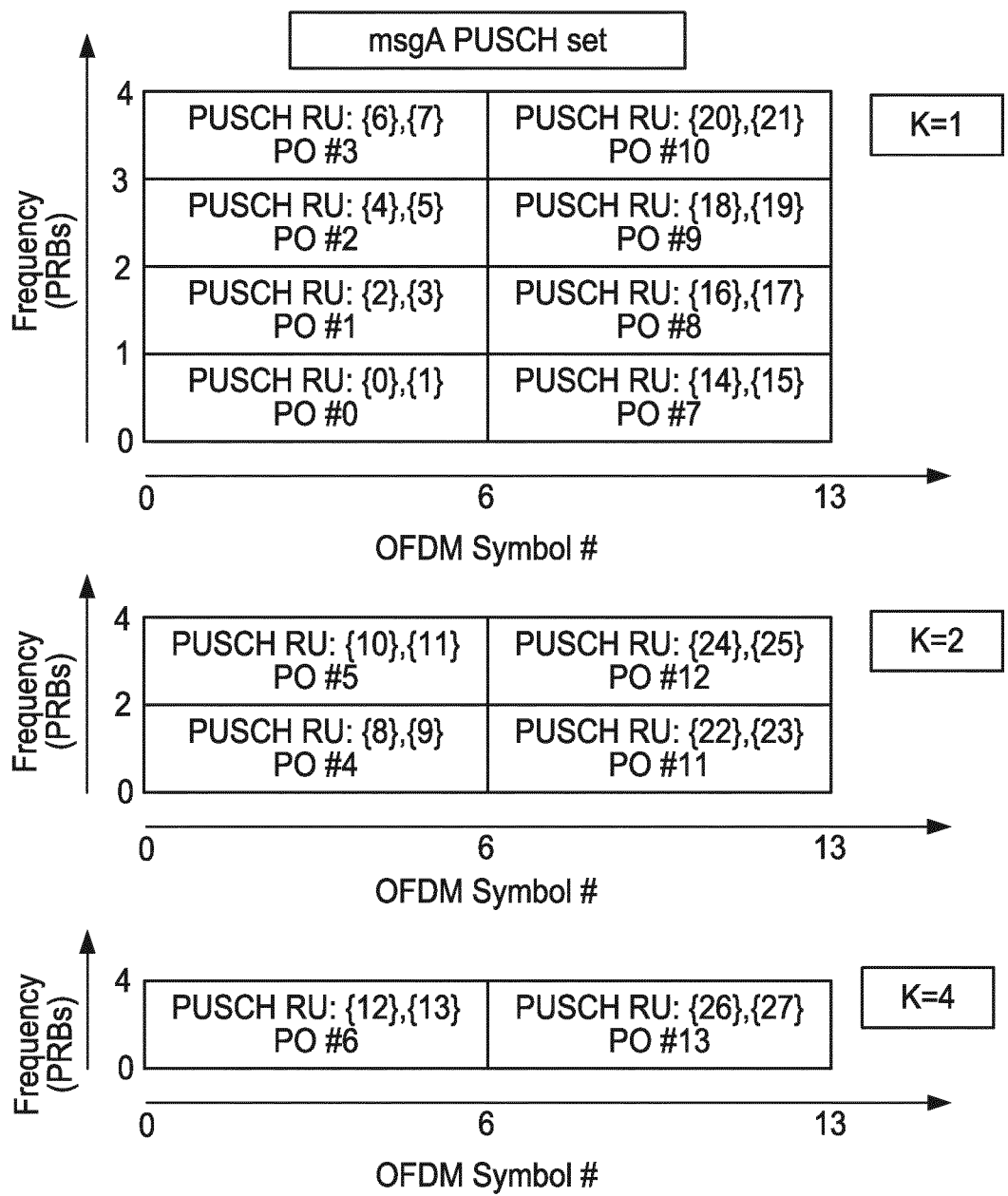
FIG. 4A illustrates a PUSCH Occasion for a 2-step RA procedure.
FIG. 4B illustrates an exemplary PUSCH set for MsgA in a 2-step RA procedure.

As shown in FIG. 4B, a set of resources containing multiple PUSCH occasions is defined and referred to herein as the "MsgA PUSCH set" where:
  A PUSCH resource unit (PUSCH RU) is defined as the PUSCH occasion ('PO') and DMRS port/DMRS sequence used for MsgA payload transmission. The PUSCH RU should permit MU-MIMO reception and allow multiple UEs to share the same PUSCH PO, while their respective MsgA PUSCH can still be decoded by the receiving access node 110. Each PUSCH RU corresponds to a PRACH preamble. The PUSCH RU may support of both DMRS port and sequence or just one.
  Each PUSCH PO occupies a contiguous set of subcarriers and symbols. In some embodiments, a guard band (in PRBs) or guard time can be provided for each PO.
  The time and frequency domain resource allocations of the PUSCH POs use the associated RACH occasion as reference.
  A MsgA PUSCH set occurs periodically with the same period as the associated RACH occasions and has a known length in symbols and position in frequency.
  A MsgA PUSCH set can contain multiple POs contiguous in frequency and in time (including guard band or period if defined). In some embodiments, the MsgA PUSCH set supports frequency hopping.

PUSCH RUs have 'K' PRBs. K can vary, and a given PRB can contain PUSCH RUs with different size. K is identified by which preamble is used. If a PRB contains PUSCH RUs with different size K, DMRS IDs are a function of size; Total #DMRS=(#PO Sizes)×(PUSCH RUs per PO). UE can randomly select PUSCH RU index 'n' out of the configured set.

The UE 120 may be configured with one or more BWPs on a given component carrier, of which only one can be active at a time. The active BWP at any given time defines the UE's operating bandwidth within the cell's operating bandwidth. For initial access, and until the UE's configuration in a cell is received, the initial BWP detected from system information (SI) is used. In this case, the initial BWP becomes the active BWP. Thereafter, the UE 120 may change the active BWP, i. e., switch from the current active BWP to another BWP configured by the network. A BWP not currently used is referred to as an inactive BWP.

Figure 5:
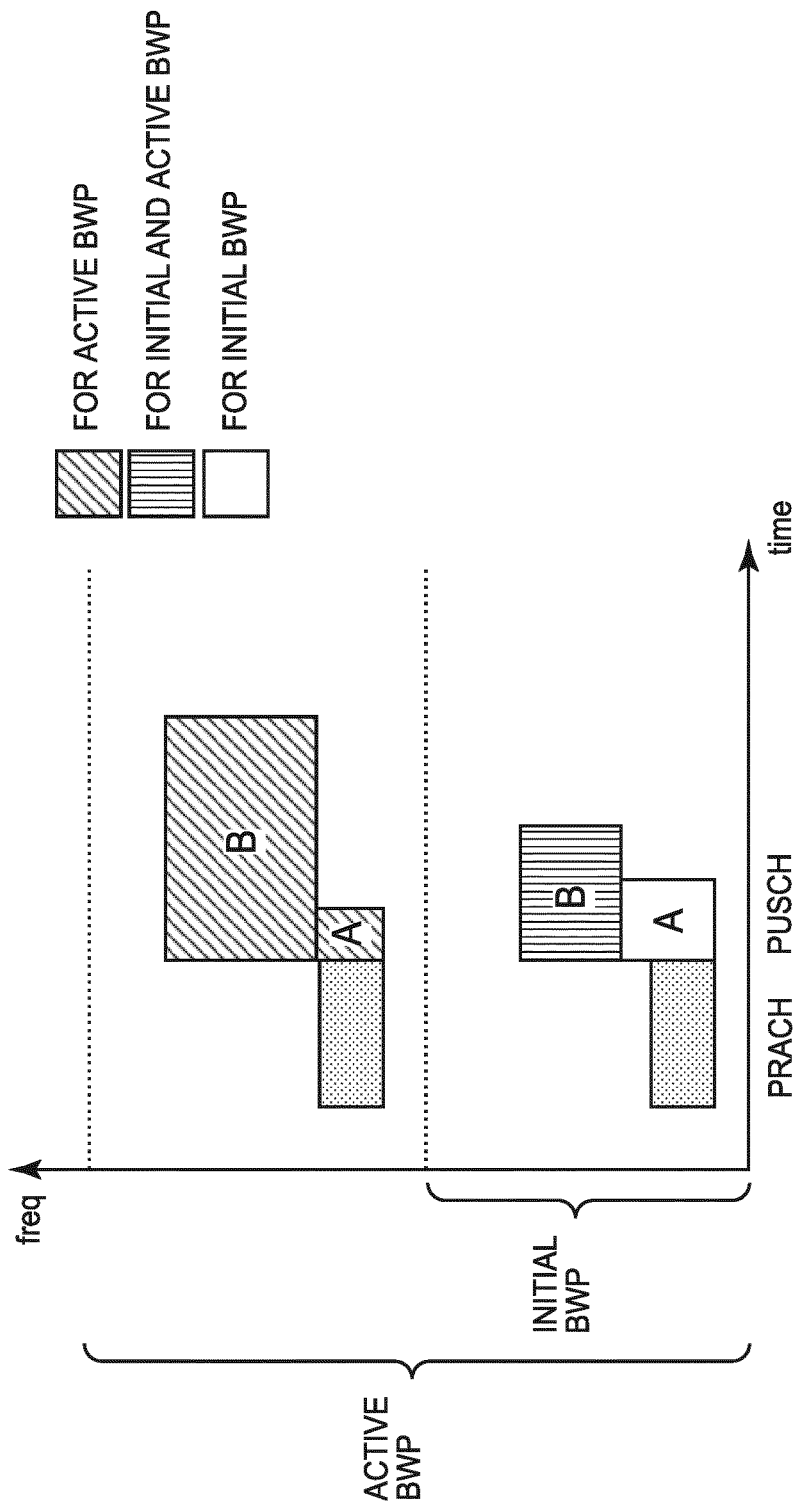
FIG. 5 illustrates a basic configuration of 2-step RA resources for the initial BWP and active BWP.

According to one aspect of the disclosure, the network configures the UE 120 with multiple BWPs including a default BWP or initial BWP and at least one additional BWP that can overlaps the initial or default BWP. UE 120 is configured with an initial or default BWP for which 2-step PRACH/PUSCH resources and preamble group are configured and an active BWP overlapping the 2-step PRACH/PUSCH resources in the initial BWP. The term active BWP refers to an additional BWP in addition to the initial BWP configured by the network that has been activated by the UE 120. The active BWP is also configured with 2-step PRACH/PUSCH resources in the non-overlapping portion of the active BWP. The basic configuration of MsgA PRACH and MsgA PUSCH resources for the initial BWP and active BWP is shown in FIG. 5. Connected UEs in the active BWP are allowed to use the MsgA PRACH and MsgA PUSCH resources in the initial BWP without switching active BWP. In one embodiment, after transmitting MsgA, the UE 120 monitors for MsgB reception on the active BWP regardless of the BWP on which MsgA was transmitted. A connected UE 120 with an active BWP can use or fallback on the preamble groups and PRACH resources in the initial BWP even when the active BWP is configured without changing the active BWP.

FIGS. 6-11 illustrate exemplary configurations of random access resources for 2-step random access including both PRACH resources and PUSCH resources. In the illustrated examples, the PUSCH resources for MsgA transmission are linked with corresponding PRACH resources so there is a one-to-one correspondence a between PRACH occasions and PUSCH occasions. The UE 120 selects a PRACH occasion in either the active BWP or inactive BWP for 2-step random access depending on the PUSCH resources it needs.

Figure 6:
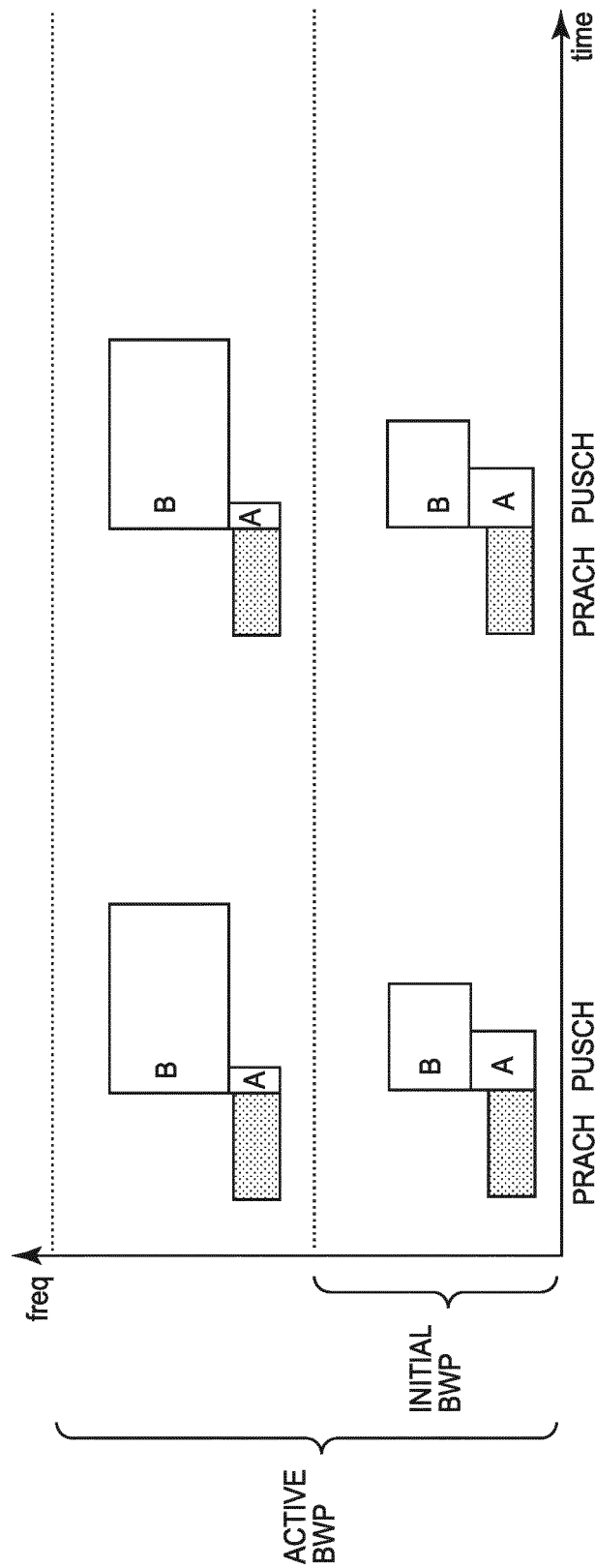
FIG. 6 illustrates an exemplary RA resource configuration for 2-step RA where the PRACH occasions occur with the same periodicity.

FIG. 6 illustrates an exemplary RA resource configuration for 2-step RA where the PRACH occasions in the initial BWP and active BWP occur with the same periodicity. In this example, the network configures the 2-step PRACH/PUSCH resources on an initial BWP. The configuration may for instance comprise:

a preamble group A where the PUSCH size is specifically tuned to fit the RRCSetupRequest message used by UEs in RRC_IDLE state, i.e., a size of 56 or 72 bits depending on the format of the UE identifier.

a preamble group B with a size to fit the RRCResumeRequest for RRC_INACTIVE UEs and possibly a small amount of user data. Typically, in the order of one hundred bits.

The networks also configure the UE 120 with 2-step RA resources on the non-overlapping portion of the active BWP, which is configured to be the UE's active BWP, i.e., the one in which the UE120 is operating. The 2-step RA configuration on this non-overlapping active BWP may for instance comprise:

A preamble group A where the PUSCH resource allocation size is specifically tuned to fit a C-RNTI MAC CE and a short BSR, which means a size of 24 bits.

A preamble group B with an associated large PUSCH resource allocation size to transmit UE data, typically in the order of several hundred bits.

Figure 7:
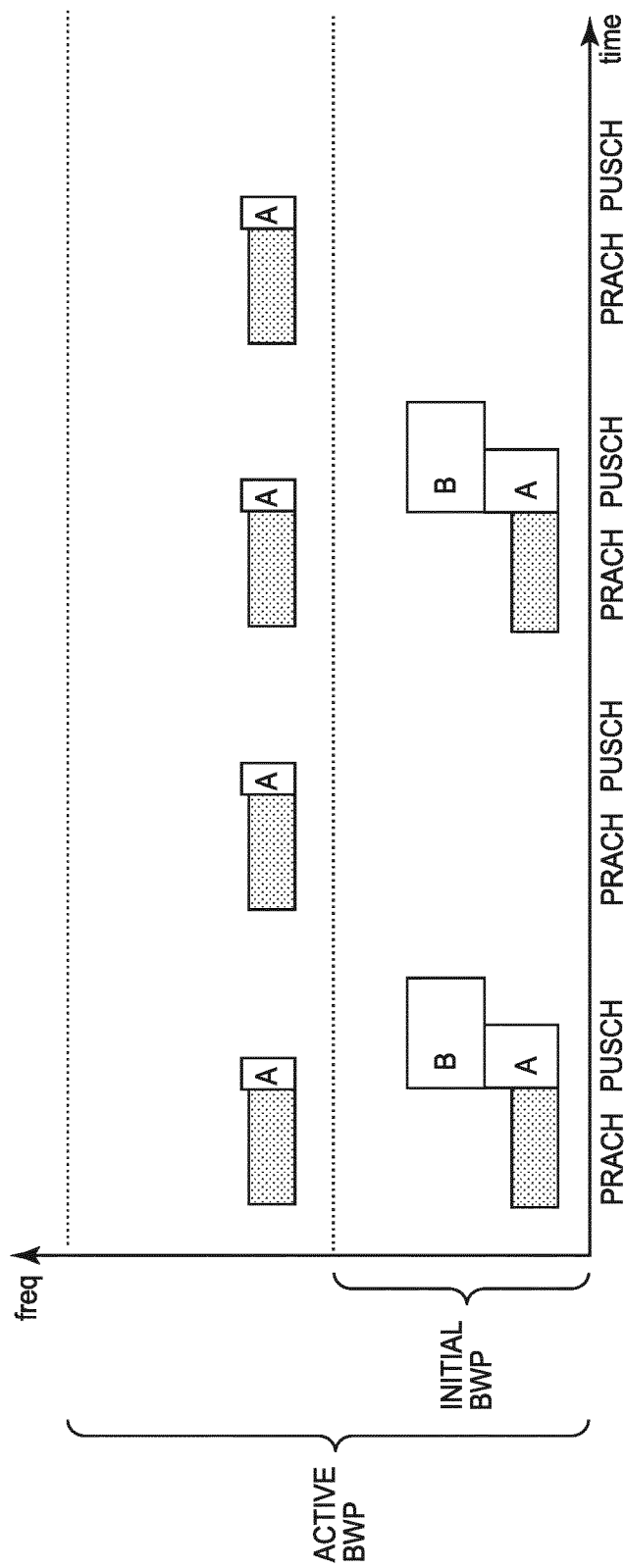
FIG. 7 illustrates an exemplary RA resource configuration for 2-step RA where the PRACH occasions occur with different periodicity and without a configured preamble B in the active BWP.

FIG. 7 illustrates an exemplary RA resource configuration for 2-step RA where the PRACH occasions occur with different periodicity. In this example, the active BWP PRACH occasions are twice as frequent as the PRACH occasions in the initial BWP and no preamble group Bs are configured in the non-overlapping portion of the active BWP.

Figure 8:
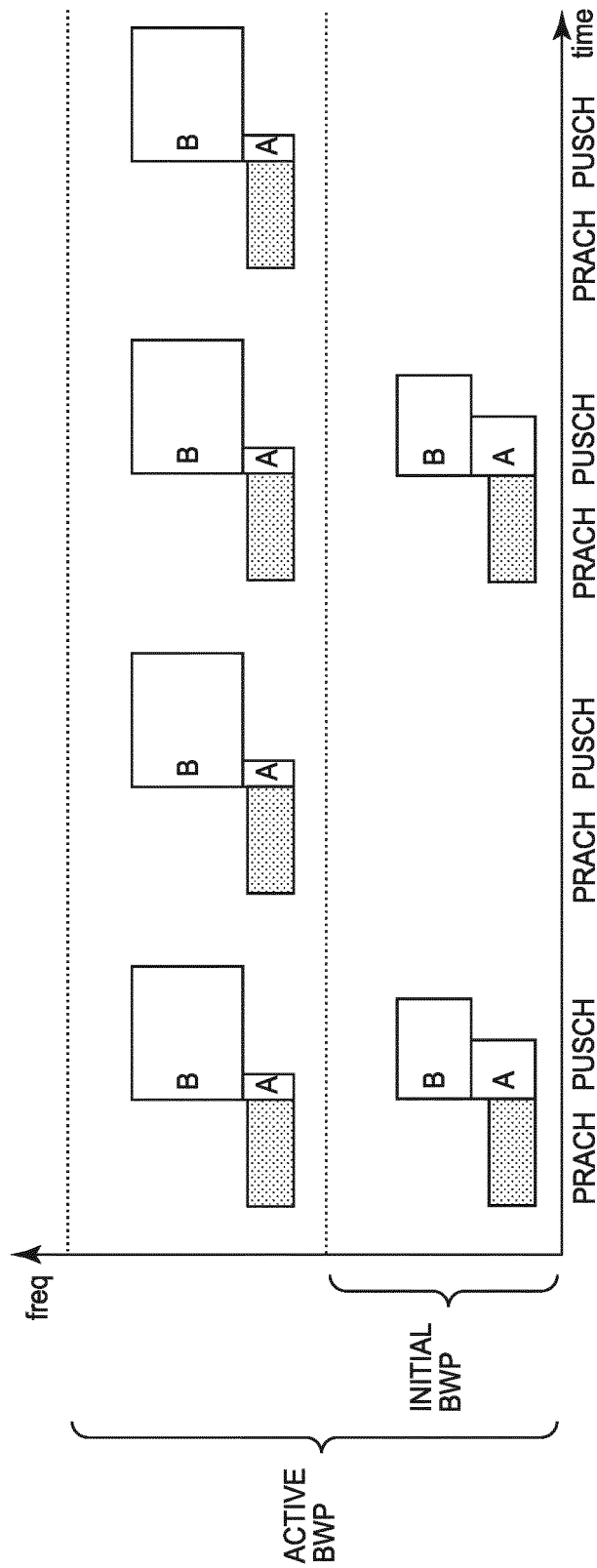
FIG. 8 illustrates an exemplary RA resource configuration for 2-step RA with different periodicities and two preamble groups configured in each BWP where the PRACH occasions in the active BWP occur with twice the frequency of the PRACH occasions in the inactive BWP.

FIG. 8 illustrates an exemplary RA resource configuration for 2-step RA where the PRACH occasions occur with different periodicities and two preamble groups are configured in each BWP. In this example, the active BWP PRACH occasions are twice as frequent as the PRACH occasions in the initial BWP and a preamble group B is configured in the non-overlapping portion of the active BWP. In this example, the size the preamble groups in the initial BWP is the same as FIG. 6. The preamble group A in the active BWP is allocated fewer PUSCH resources than in the initial BWP (e.g., sized similarly to the example in FIG. 6) and preamble group B in the active BWP is allocated more PUSCH resources than in the initial BWP.

Figure 9:
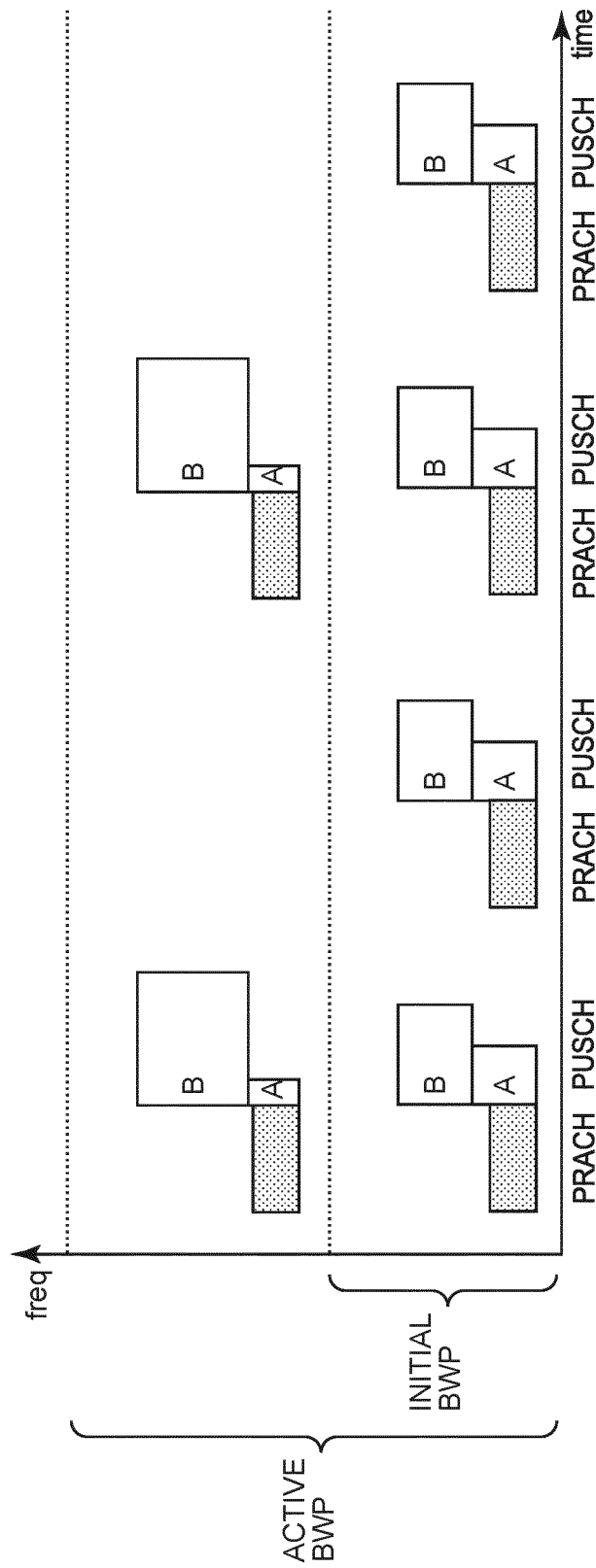
FIG. 9 illustrates an exemplary RA resource configuration for 2-step RA with different periodicities and two preamble groups configured in each BWP, where the initial BWP PRACH occasions are twice as frequent as the PRACH occasions in the active BWP.

FIG. 9 illustrates an exemplary RA resource configuration for 2-step RA where the PRACH occasions occur with different periodicities and two preamble groups are configured in each BWP. In this example, the inactive BWP PRACH occasions are twice as frequent as the PRACH occasions in the active BWP and a preamble group B is configured in the non-overlapping portion of the active BWP. In this example, the size the preamble groups in the initial BWP is the same as FIG. 6. The size the preamble groups in the active BWP is the same as FIG. 8 where preamble group A in the active BWP is allocated fewer PUSCH resources than in the initial BWP and preamble group B in the active BWP is allocated more PUSCH resources than in the initial BWP.

Figure 10:
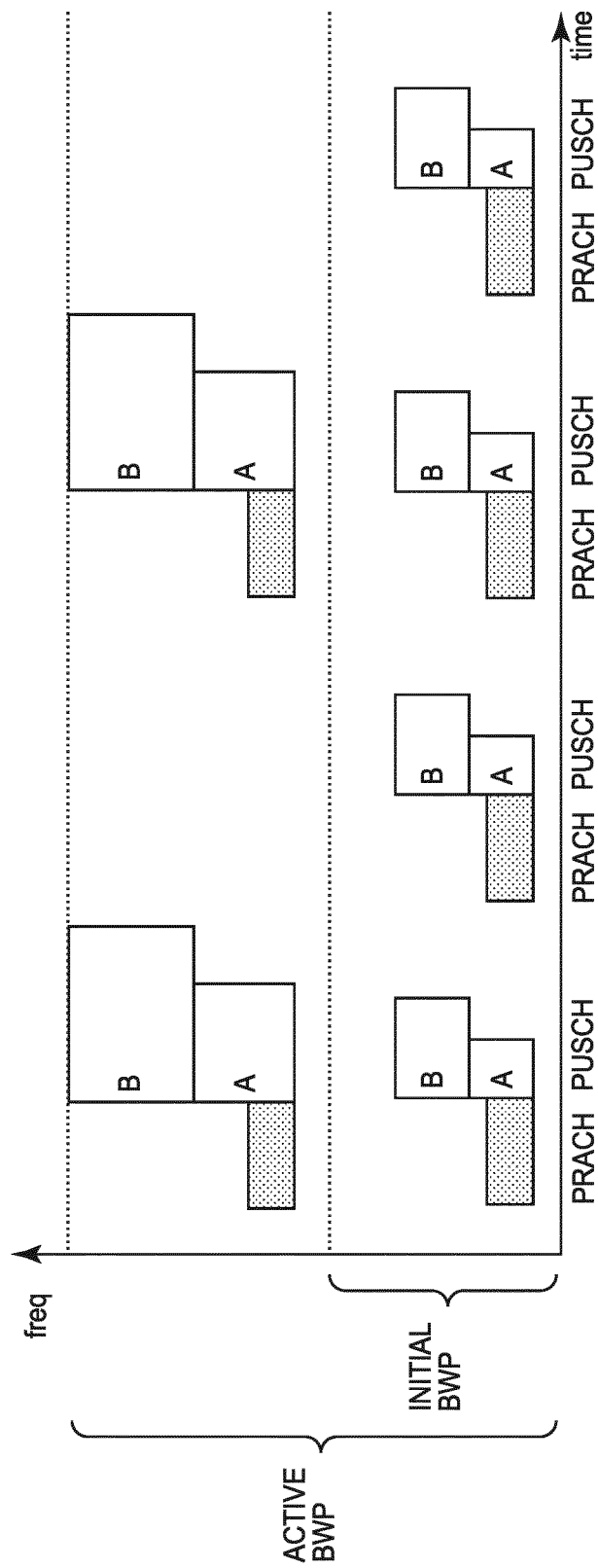
FIG. 10 illustrates an exemplary RA resource configuration for 2-step RA with different periodicities, where the initial BWP PRACH occasions are twice as frequent as the PRACH occasions in the active BWP and where both preamble group A and B in the active BWP have greater PUSCH resource allocations than largest allocation (i.e., associated with preamble group B) in the initial BWP.

FIG. 10 illustrates an exemplary RA resource configuration for 2-step RA with different periodicities, where the initial BWP PRACH occasions are twice as frequent as the PRACH occasions in the active BWP and where both preamble group A and B in the active BWP have greater PUSCH resource allocations than the largest allocation (i.e., associated with preamble group B) in the initial BWP.

Figure 11:
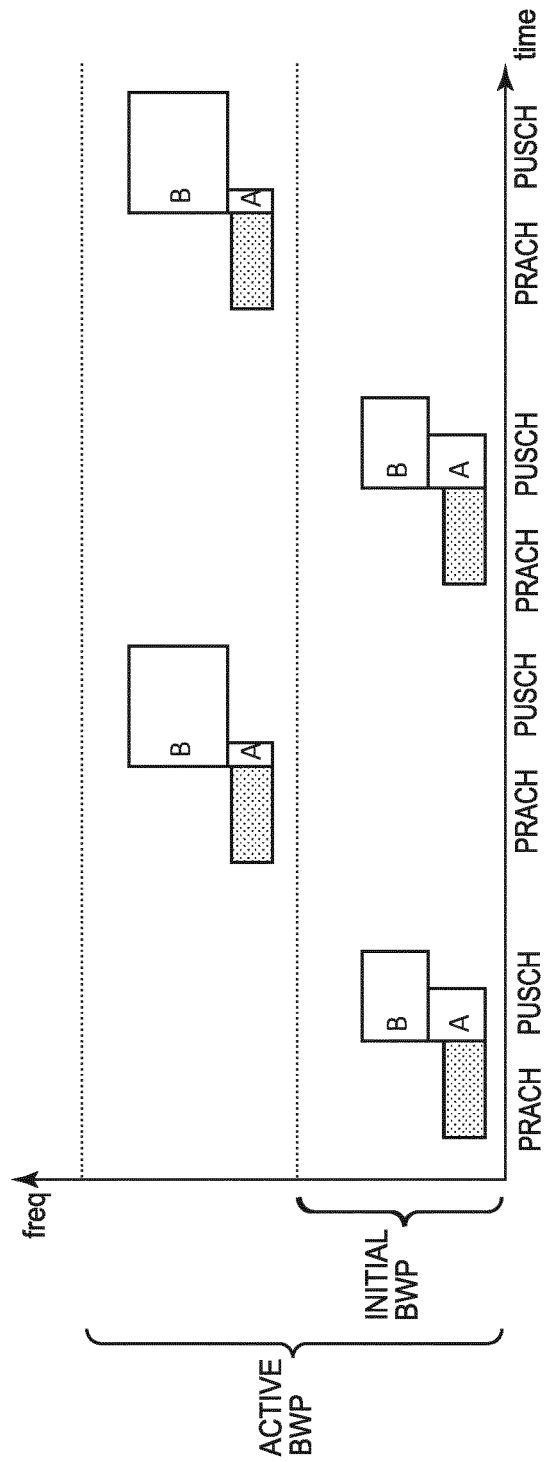
FIG. 11 illustrates an exemplary RA resource configuration for 2-step RA where the PRACH occasions have the same periodicity in the active BWP as in the initial BWP, but the periods are phase shifted such that the PRACH occasions in the active BWP do not occur simultaneously with the PRACH occasions in the initial BWP.

FIG. 11 illustrates an exemplary RA resource configuration for 2-step RA where the PRACH occasions have the same periodicity in the active BWP as in the initial BWP, but the periods are phase shifted such that the PRACH occasions in the active BWP do not occur simultaneously with the PRACH occasions in the initial BWP. In this example, preamble group A in the active BWP is allocated fewer PUSCH resources than in the initial BWP (e.g., sized similarly to the example in FIG. 6) and preamble group B in the active BWP is allocated more PUSCH resources than in the initial BWP.

Figure 12:
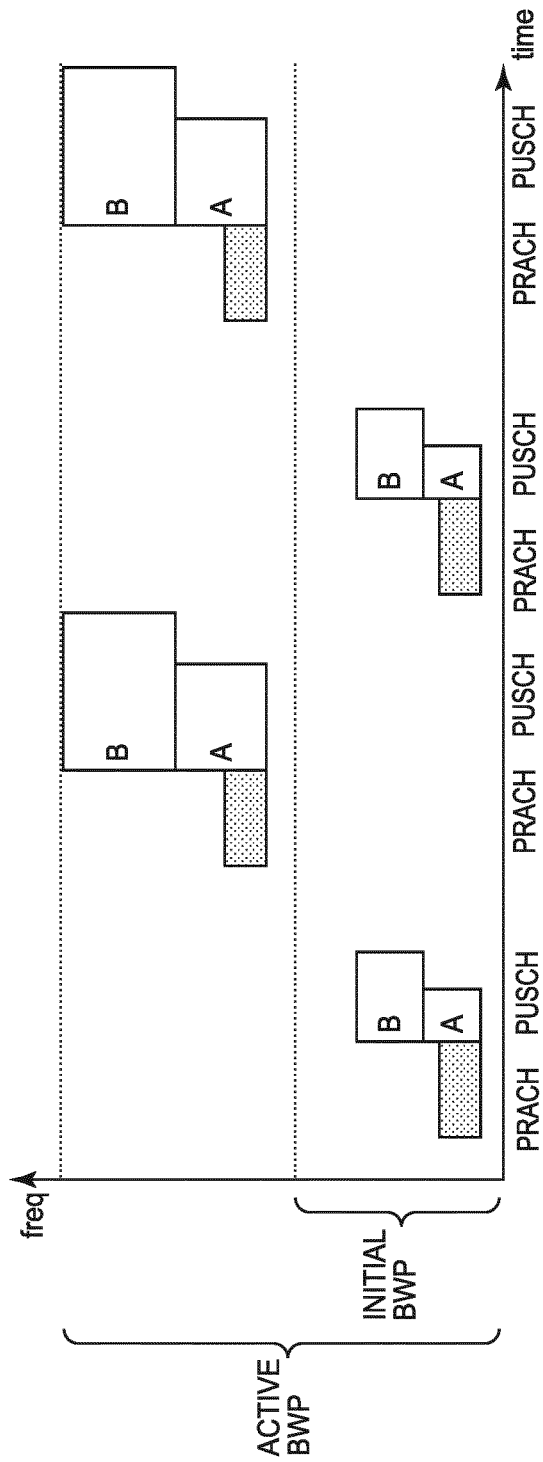
FIG. 12 illustrates an exemplary RA resource configuration for 2-step RA where the PRACH occasions have the same periodicity in the active BWP as in the initial BWP, but the periods are phase shifted such that the PRACH occasions in the active BWP do not occur simultaneously with the PRACH occasions in the initial BWP, and where both preamble group A and B in the active BWP have greater PUSCH resource allocations than biggest allocation (i.e., associated with preamble group B) in the initial BWP.

FIG. 12 illustrates an exemplary RA resource configuration for 2-step RA where the PRACH occasions have the same periodicity in the active BWP as in the initial BWP, but the periods are phase shifted such that the PRACH occasions in the active BWP do not occur simultaneously with the PRACH occasions in the initial BWP. In this example, both preamble groups A and B in the active BWP have greater PUSCH resource allocations than the largest allocation (i.e., associated with preamble group B) in the initial BWP.

In the embodiments herein described, the active BWP may not completely overlap the initial BWP but should at least overlap the 2-step RA resources (PRACH and PUSCH) on the initial BWP. If there are frequency multiplexed 2-step RA resources on the initial BWP, at least one of the multiplexed sets of 2-step RA resources needs to be overlapped.

The 2-step RA resources for the initial BWP are configured via the system information, in particular SIB1. Configuration of additional BWPs, and their 2-step RA resources, are configured via dedicated RRC signaling.

If a defaultDownlinkBWP and defaultUplinkBWP has been configured for the UE 120, this BWP may take the place of the initial BWP in the embodiments described above.

In one embodiment, the network 10 configures an indication whether UEs 120 are allowed to use the PRACH resources of the initial BWP, including the preamble groups (either preamble group A or preamble group B) of the initial BWP and for what purpose it may use these resources in the initial BWP. The purposes, which can be defined either as a set of indications with individual fields or a bitmap, may comprise:

Buffer Status Report (BSR);
Beam Failure Recovery;
SCell Activation/Deactivation
High-priority data In one embodiment, the network configures several BWPs with 2-step RA resources which are overlapped by the active BWP. In this case, the principle of using the 2-step RA resources, including possibly configured preamble groups, of the overlapping non-active BWPs can be extended to one or more (even all) overlapping BWPs, i.e., even BWPs that are non-initial (but still non-active) BWPs.

UE Operation

Next, we consider UE operation where the UE 120 has been configured with a non-initial BWP containing 2-step RA resources. The non-initial BWP overlaps the initial BWP. The UE 120 has the non-initial BWP as its active BWP when a 2-step RA is triggered by the UE 120.

If the Random Access preamble group B is configured on either the active BWP or the initial BWP, or both, and if the potential MsgA size (UL data available for transmission plus MAC header and, where required, MAC CEs) is greater than RA-MsgASizeGroupA or the configured size of the MsgA PUSCH of the active BWP, the UE 120 can choose preamble group B and associated PRACH resources and PUSCH occasions from either the initial BWP or from the active BWP. The selection of which BWP to use depends on the configured MsgA PUSCH sizes configured in the 2-step RA configurations on the initial and active BWPs and the wanted size of MsgA (UL data available for transmission plus MAC header and, where required, MAC CEs) combined with the pathloss of the UE 120.

For receiving the response to MsgA, i.e., MsgB, the UE 120 could either use the search space as defined by the active BWP or use the search space as defined by the initial BWP, or monitor both. As another alternative, since the BWPs are overlapping, the network could configure the same search space for both BWPs. Since the UE 120 is in connected mode, MsgA PUSCH will contain a C-RNTI MAC CE so the access node 110 can identify the UE 120 and the active BWP for the UE 120. Therefore, it can send the Physical Downlink Control Channel (PDCCH) to indicate MsgB on the UEs active BWP even if MsgA transmission was done on the initial BWP. Hence, as implied above, the network will always transmit MsgB (in response to a MsgA from the UE 120) such that it matches the UE's search space for MsgB in the UE's active BWP, regardless of which BWP 2-step RA resources is used for the MsgA transmission.

In another embodiment, the network transmits MsgB such that it matches the UE's search space for MsgB in the BWP whose 2-step RA resources the UE 120 used for the MsgA transmission. In another embodiment, the network always transmits MsgB such that it matches the UE's search space for MsgB in the initial BWP, irrespective of which BWP's 2-step RA resources the UE 120 used for the MsgA transmission, e.g., if no search space for MsgB is configured in the active BWP. In yet another embodiment, the network may transmit MsgB such that it matches any of UE's search spaces for MsgB, i.e., either the search space in the initial BWP or the search space in the active BWP, irrespective of which BWP's 2-step RA resources the UE 120 used for the MsgA transmission. In yet another embodiment, the network may transmit MsgB such that it matches any of UE's search spaces for MsgB, i.e., either the search space in the initial BWP or the search space in the active BWP, if the UE 120 used the 2-step RA resources of the initial BWP for the MsgA transmission, but if the UE 120 used the active BWP's 2-step RA resources for the MsgA transmission, then the network transmits MsgB such that it matches the UE's search space for MsgB in the UE's active BWP.

In any of the above embodiments, where the network transmits MsgB such that it matches the search space for MsgB in the initial BWP, only the PDCCH transmission is confined to the initial BWP (in accordance with the search space for MsgB in the initial BWP), but the actual MsgB, whose transmission resources are allocated by the PDCCH transmission, may be transmitted using transmission resources anywhere in the active BWP, whether they overlap with the initial BWP or not.

In some embodiments, the UE 120 is configured with a search space for MsgB in the active BWP, whose time domain configuration equals the time domain parts of the search space for MsgB in the initial BWP, while the frequency domain part of the search space, i.e., the Control Resource Set (CORESET), is configured to be different in the UE's active BWP than in the initial BWP.

Note that for a UE 120 in RRC_CONNECTED state, no regular MsgB is transmitted in response to the MsgA transmission, but instead another PDCCH transmission marks the completion of the 2-step RA procedure. Hence, for a UE 120 in RRC_CONNECTED state, the relevant search space in all the above-described search space related embodiments is not necessarily a search space used for MsgB reception, but is the search space the UE 120 uses for the expected PDCCH transmission.

As another embodiment, in case the network has configured several BWPs with 2-step RA resources which are overlapped by the active BWP, the UE 120 may transmit MsgA on any BWP which has 2-step RA resources that are overlapped by the active BWP (i.e., selection of 2-step resources is not limited to the active BWP and initial BWP as long as the active BWP overlaps the 2-step resources on the BWP where MsgA is transmitted). Also, the other above described embodiments could apply for cases where the active BWP overlap 2-step RA resources of other non-initial BWPs.

As an example, to illustrate selection between different BWPs, assume that:
 the wanted size of MsgA is X bits;
 the configured PUSCH resource allocation size of preamble group B in the initial BWP is x0;
 the configured PUSCH resource allocation size of preamble group B in the active BWP is x1; and
 X>x1>x0.

In this example, the UE selects in order of preference, 1) preamble group B in the active BWP if the pathloss requirements are fulfilled for this selection, 2) preamble group B in the initial BWP if the pathloss requirements are fulfilled for this selection, or 3) preamble group A in the active BWP.

As a variation of the previous example, if the pathloss requirement is not fulfilled for preamble group B in any of the BWPs, the UE 120 selects preamble group A in the initial BWP. As another variation, if the pathloss requirement is not fulfilled for preamble group B in any of the BWPs, the UE's choice between preamble group A for the initial BWP and preamble group A for the active BWP is configured by the network.

In another example, the UE 120 may use preamble group A on initial BWP if the data in MsgA is of high priority. In this example assume that the network configures PUSCH resources as follows:
 the configured PUSCH resource allocation size of preamble group A in the initial BWP is x0, and
 the configured PUSCH resource allocation size of preamble group B in the initial BWP is x1, and
 the configured PUSCH resource allocation size of preamble group A in the active BWP is x2, and
 no preamble group B is configured in the active BWP
 X>x1>x0>x2 and the data is of high priority, then In this example, the UE 120 selects preamble group B in the initial BWP if the pathloss requirements are fulfilled for this selection. Otherwise, the UE 120 selects preamble group A in the initial BWP.

Several other configurations governing the UE's selection of preamble group in the active BWP or the initial BWP can be conceived. For instance, the network may configure the UE 120 to make this choice based the Quality of Service (QOS) requirements or the delay requirement of the data or service/application that triggered the need for the network access, the type of UE 120 (including the UE's capabilities), the UE's battery status, or the current reference signal received power (RSRP) (or other channel quality measure such as reference signal received quality (RSRQ), signal-to-interference plus noise ratio (SINR), signal-to-noise (SNR) or pathloss) experienced by the UE 120 in the active BWP and the initial BWP. The UE 120 could also be configured to use any combination of these data, UE or channel properties.

When different PRACH occasion periodicities are configured in the active BWP and the initial BWP, or when the same periodicity is used but the periods are shifted such that the PRACH occasions in the active BWP do not occur simultaneously with the PRACH occasions in the initial BWP, the UE 120 may be configured to take into account in which BWP the next PRACH occasion will occur first. Together with any of the above-mentioned data, UE and/or channel quality properties, this may form the basis for the UE's choice of PRACH occasion and PRACH resources, including BWP and preamble group.

As one example, considering a 2-step RA configuration as in FIG. 10 or FIG. 12, a UE 120 may be configured to select the PRACH occasion (and its associated 2-step RA resources) that occurs first (after the need for random access has been triggered), provided that the PUSCH resource allocation size is large enough for the intended MsgA and provided that the UE's pathloss meets the requirement (if any). Otherwise, the UE 120 should select preamble group A (if its PUSCH resource allocation is large enough) or preamble group B in the active BWP.

As another example, the UE 120 may be configured to always select a PRACH occasion in the active BWP, unless the data/service/application that triggered the need for the 2-step RA has strict low latency requirements (e.g., a ultra reliable, low latency communications (URLLC) UE 120 or application), in which case the UE 120 should select the PRACH occasion that occurs first, irrespective of BWP.

As another example, the UE 120 may be configured to select the first PRACH occasion where it can select a preamble group (with fulfilled pathloss requirement if there is any pathloss requirement associated with the preamble group) which has an associated PUSCH resource allocation size that it large enough to transmit the UE's desired MsgA.

In another embodiment, the choice of whether to use the 2-step RA resources of the active BWP or the initial BWP is left to the UE 120 (i.e., left to UE implementation). The UE 120 may autonomously choose to (or be implemented to) use the above-mentioned data, UE and/or channel quality properties as basis for the choice. Essentially, any of the above-described examples of how the UE 120 can be configured to select 2-step RA resources (including BWP, PRACH occasion, PRACH resources and preamble group (and thus PUSCH resource allocation size)) may in this embodiment be left to UE implementation.

As another example, the UE 120 may additionally be configured to make a choice of preamble group B and associated PRACH resources and PRACH occasions from either the initial BWP or from the active BWP for where the UE selection of which PRACH occasions to consider in this selection is configured by an RO mask that indicates the available subset of random access ROs shared between BWPs.

The above described solution and embodiments may be generalized to also apply for 4-step RA. A difference is that for 4-step RA there are no pre-configured PUSCH transmission resources, but the UE 120 can use the thresholds for preamble group B as an indication of the PUSCH resource allocation size that will be configured by the UL grant in the RAR. It would also be possible to introduce a new configuration possibility in the system information, by which the network could indicate the size of the PUSCH resource allocation associated with preamble group A and/or the PUSCH resource allocation size associated with preamble group B for 4-step RA.

Another possible generalization has already been mentioned but is repeated here. That is, the herein described solutions and embodiments are not only applicable to scenarios where the UE's active BWP overlaps with the initial BWP (such that it covers 2-step RA resources in the initial BWP), but also to scenarios where the UE's active BWP overlaps with 2-step RA resources in any other non-initial BWP configured for the UE 120.

Figure 13:
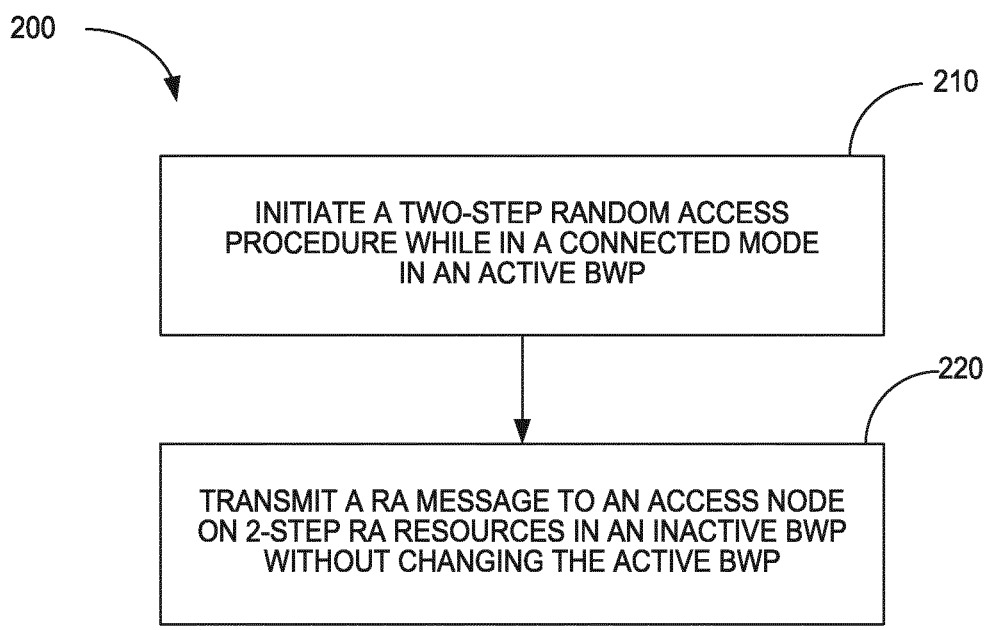
FIG. 13 illustrates a basic method implemented by a UE in a wireless communication network.

FIG. 13 illustrates a basic method 200 implemented by a UE 120 in a wireless communication network. The UE 120 initiates a 2-step RA procedure while in a connected mode in an active BW (block 210). During the RA procedure, the UE 120 transmits a RA message to the access node 110 on 2-step RA resources in an inactive BWP without changing the active BWP (block 220).

Some embodiments of the method 200 further comprise monitoring a search space in the inactive BWP for a random access response from the access node.

Some embodiments of the method 200 further comprise monitoring a search space in the active BWP for a random access response from the access node.

Some embodiments of the method 200 further comprise monitoring a common search space for the inactive BWP and the active BWP for a random access response from the access node.

In some embodiments of the method 200, prior to transmitting, the UE selects random access resources from among first 2-step random access resources in the inactive BWP configured for the UE to use in both connected and idle/inactive modes and second 2-step random access resources in the active BWP overlapping the inactive BWP and configured for the UE to use in connected mode.

In some embodiments of the method 200, the 2-step random access resources in the active BWP are in a non-overlapping portion of the active BWP.

In some embodiments of the method 200, a periodicity of PUSCH occasions for the active BWP and inactive BWP are different.

In some embodiments of the method 200, the periodicity of PUSCH occasions for the active BWP is greater than the periodicity of the PUSCH occasions for the inactive BWP are different.

In some embodiments of the method 200, the periodicity of PUSCH occasions for the active BWP is less than the periodicity of the PUSCH occasions for the inactive BWP are different.

In some embodiments of the method 200, the PUSCH occasions for the active BWP are offset in the time domain from PUSCH occasions for the inactive BWP.

In some embodiments of the method 200, the inactive BWP comprises an initial BWP configured for the UE or a default BWP configured for the UE.

Figure 14:
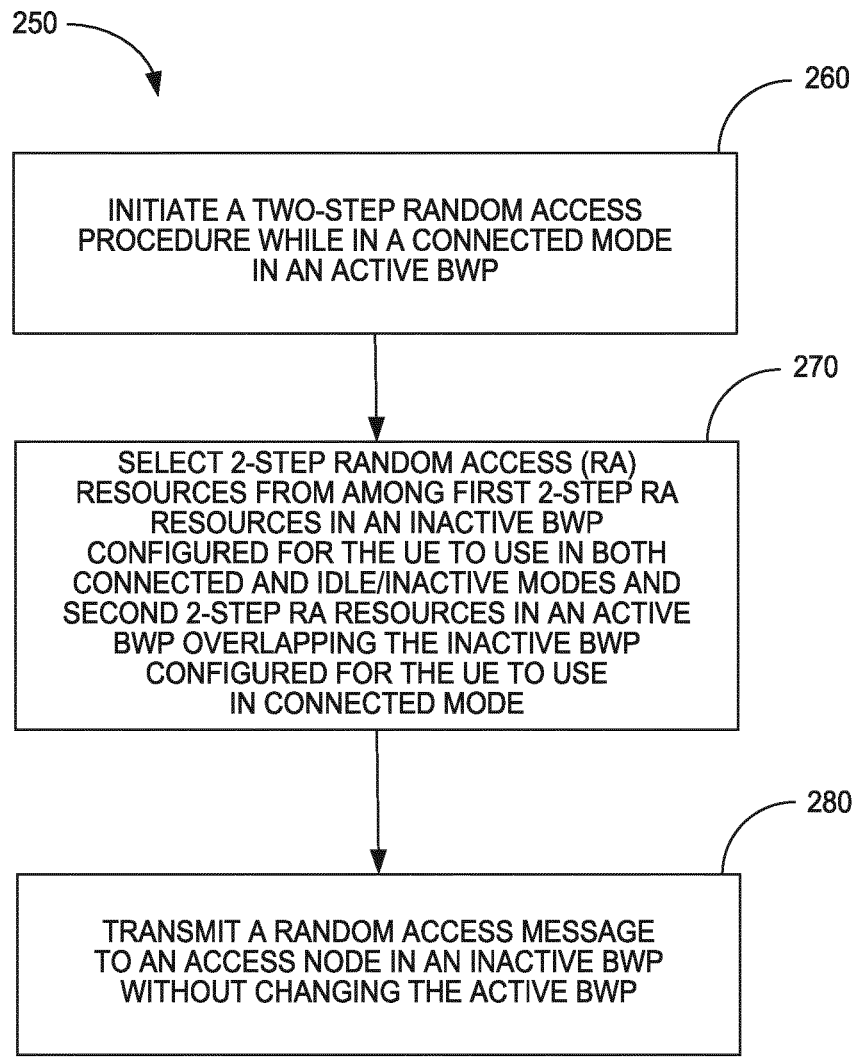
FIG. 14 illustrates a more detailed example of a method implemented by a UE in a wireless communication network.

FIG. 14 illustrates a more detailed example of a method 250 implemented by a UE 120 in a wireless communication network. The UE 120 initiates a 2-step RA procedure while in a connected mode in an active BW (block 260). The UE 120 further selects 2-step RA resources from among first 2-step RA resources in an inactive BWP configured for the UE 120 to use in both connected and idle/inactive modes and second 2-step RA resources in an active BWP overlapping the inactive BWP configured for the UE 120 to use in connected mode (block 270). The UE 120 transmits a RA message to the access node 110 in the inactive BWP without changing the active BWP (block 280).

In some embodiments of the method 250, selecting 2-step random access resources comprises selecting the 2-step random access resources depending on a size of the random access message.

In some embodiments of the method 250, the UE selects the 2-step random access resources in the inactive BWP when the random access resources in the active BWP are insufficient to transmit the random access message.

In some embodiments of the method 250, selecting 2-step random access resources comprises selecting the 2-step random access resources depending on a priority of the random access message.

In some embodiments of the method 250, the UE selects the 2-step random access resources in the inactive BWP for high priority random access messages.

In some embodiments of the method 250, the UE selects the 2-step random access resources in the inactive BWP based on or further based on a path loss between the UE and the access node.

In some embodiments of the method 250, a periodicity of PUSCH occasions for the active BWP and inactive BWP are different.

In some embodiments of the method 250, the periodicity of PUSCH occasions for the active BWP is greater than the periodicity of the PUSCH occasions for the inactive BWP are different.

In some embodiments of the method 250, the periodicity of PUSCH occasions for the active BWP is less than the periodicity of the PUSCH occasions for the inactive BWP are different.

In some embodiments of the method 250, the PUSCH occasions for the active BWP are offset in the time domain from PUSCH occasions for the inactive BWP.

In some embodiments of the method 250, the inactive BWP comprises an initial BWP configured for the UE or a default BWP configured for the UE.

Figure 15:
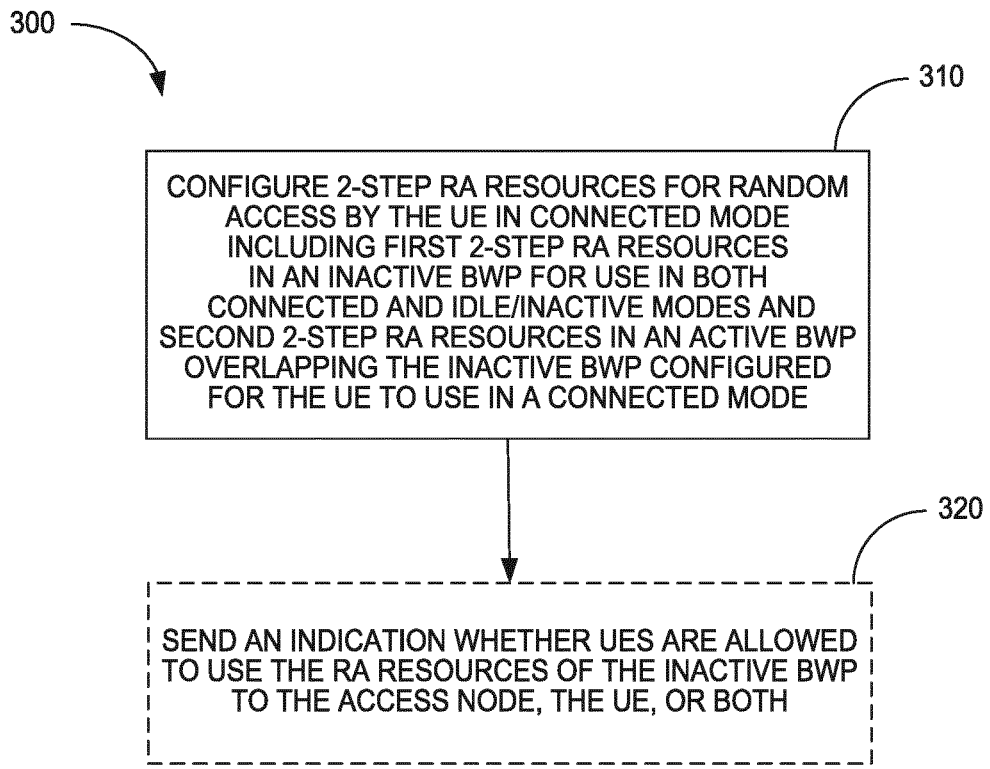
FIG. 15 illustrates a basic method implemented by a network node (e.g., access node or CN node) in a wireless communication network.

FIG. 15 illustrates a basic method 300 implemented by a network node (e.g., access node or CN node) in a wireless communication network. The network node may comprise an access node 110 (e.g., gNB or ng-eNB) or a core network (CN) node. The network node configures 2-step RA resources for RA by the UE 120 in connected mode including first 2-step RA resources in an inactive BWP for use in both connected and idle/inactive modes and second 2-step RA resources in an active BWP overlapping the inactive BWP configured for the UE 120 to use in a connected mode (block 310). In some embodiments, the network node may optionally send an indication whether UEs 120 are allowed to use the PRACH resources of the inactive BWP to the access node 110, UE 120, or both (block 320).

In some embodiments of the method 300, the network configures two or more inactive BWPs with 2-step random access resources that are overlapped by the active BWP.

Some embodiments of the method 300 further comprise sending an indication whether UEs are allowed to use the random access resources of the inactive BWP to the access node.

In some embodiments of the method 300, the indication specifies one or more purposes for which the 2-step resources in the inactive BWP can be used.

In some embodiments of the method 300, the one or more purposes include at least one of a buffer status report, beam failure recovery, secondary cell (SCell) activation/deactivation, and high priority data.

In some embodiments of the method 300, the inactive BWP comprises an initial BWP or default BWP.

In some embodiments of the method 300, the 2-step random access resources for the active BWP are within the non-overlapping portion of the active BWP.

In some embodiments of the method 300, a periodicity of PUSCH occasions for the active BWP and inactive BWP are different.

In some embodiments of the method 300, the periodicity of PUSCH occasions for the active BWP is greater than the periodicity of the PUSCH occasions for the inactive BWP are different.

In some embodiments of the method 300, the periodicity of PUSCH occasions for the active BWP is less than the periodicity of the PUSCH occasions for the inactive BWP are different.

In some embodiments of the method 300, the PUSCH occasions for the active BWP are offset in the time domain from PUSCH occasions for the inactive BWP.

In some embodiments of the method 300, the inactive BWP comprises an initial BWP configured for the UE or a default BWP configured for the UE.

In some embodiments of the method 300, the network node comprises an access node.

Figure 16:
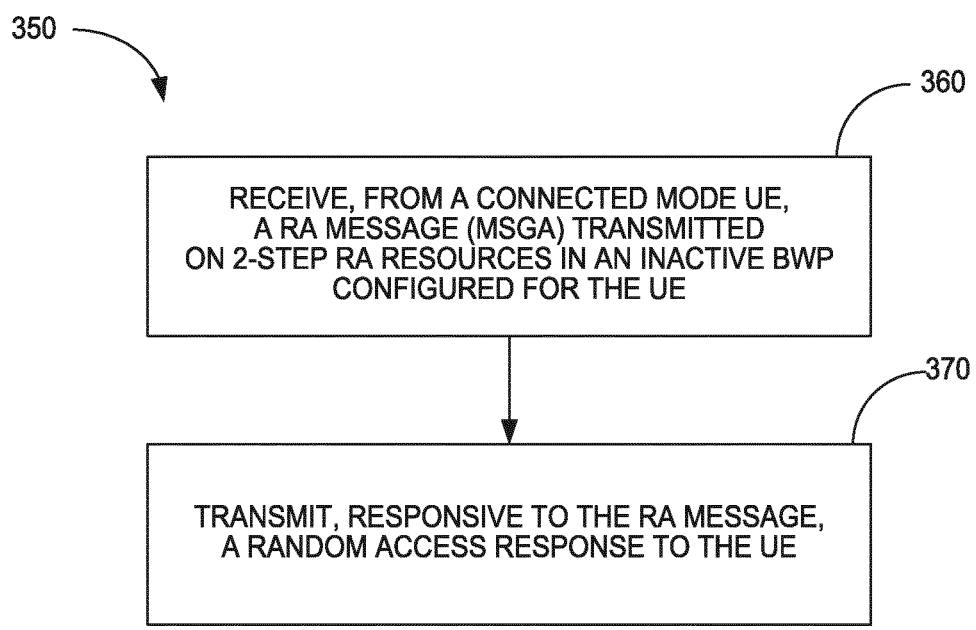
FIG. 16 illustrates a basic method implemented by an access node in a wireless communication network.

FIG. 16 illustrates a basic method 350 implemented by an access node in a wireless communication network. The access node receives, from a connected mode UE 120, a RA message transmitted on 2-step RA resources in an inactive BWP configured for the UE 120 (block 360). The access node transmits, responsive to the RA message, a RA response (block 370).

In some embodiments of the method 350, the random access response is transmitted in a search space configured for the inactive BWP.

In some embodiments of the method 350, the random access response is transmitted in a search space configured for the active BWP.

In some embodiments of the method 350, the random access response is transmitted in a common search space configured for both the active and the inactive BWP.

In some embodiments of the method 350, the inactive BWP comprises an initial BWP configured for the UE or a default BWP configured for the UE.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 17:
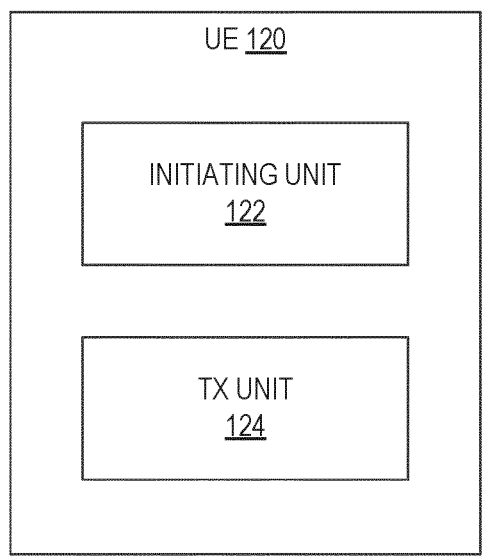
FIG. 17 illustrates a UE configured to perform the method of FIG. 13.

FIG. 17 illustrates a UE 120 configured to perform the method of FIG. 13. The UE 120 comprises an initiating unit 122 unit and a transmitting (TX) unit 124. The various units 122-124 can be implemented by hardware and/or by software code that is executed by one or more processors or processing circuits. The initiating unit 122, is configured to initiate a 2-step RA procedure while in a connected mode in an active BWP. The transmitting unit 124 is configured to transmit a RA message to the access node 110 on 2-step RA resources in an inactive BWP without changing the active BWP.

Figure 18:
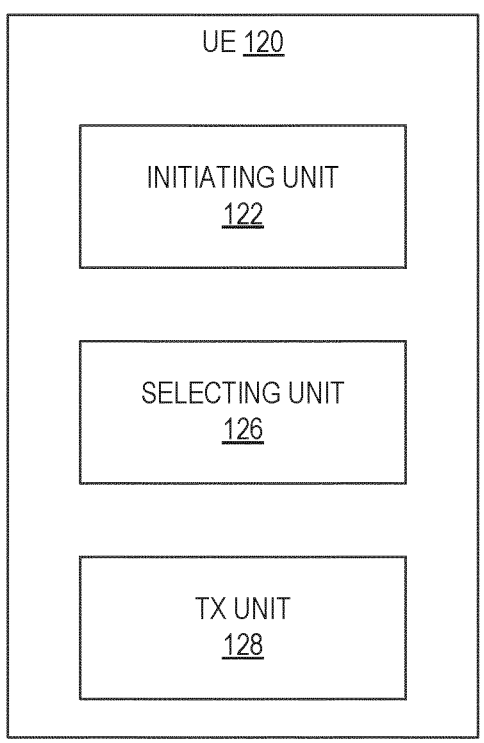
FIG. 18 illustrates a UE configured to perform the method of FIG. 14.

FIG. 18 illustrates a UE 120 configured to perform the method of FIG. 14. The UE 120 comprises an initiating unit 122, selecting unit 126 and transmitting unit 128. The various units 122-128 can be implemented by hardware and/or by software code that is executed by one or more processors or processing circuits. The initiating unit 122, as in the previous embodiment, is configured to initiate a 2-step RA procedure while in a connected mode in an active BWP. The selecting unit 126 is configured to select 2-step RA resources from among first 2-step RA resources in an inactive BWP configured for the UE 300 to use in both connected and idle/inactive modes and second 2-step RA resources in an active BWP overlapping the inactive BWP configured for the UE 300 to use in connected mode. The transmitting unit 128 is configured to transmit a RA message to the access node 110 in the inactive BWP without changing the active BWP.

Figure 19:
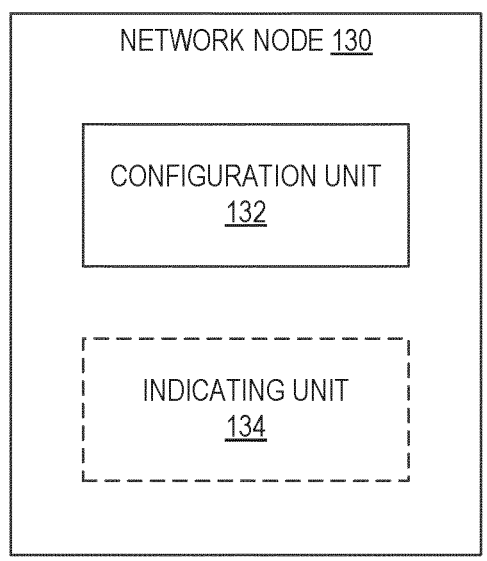
FIG. 19 illustrates a network node (e.g. access node or CN node) configured to perform the method of FIG. 15.

FIG. 19 illustrates a network node (e.g., access node 110 or CN node) 130 configured to perform the method of FIG. 15. The network node 130 comprises a configuration unit 132 and optionally an indicating unit 134, which can be implemented by hardware and/or by software code that is executed by one or more processors or processing circuits. The configuration unit 132 is operative to configure 2-step RA resources for RA by the UE 120 in connected mode including first 2-step RA resources in an inactive BWP for use in both connected and idle/inactive modes and second 2-step RA resources in an active BWP overlapping the inactive BWP configured for the UE 120 to use in a connected mode. The indicating unit 134, when present, is configured to send an indication whether UEs 120 are allowed to use the PRACH resources of the inactive BWP to the access node 110, UE 120, or both.

Figure 20:
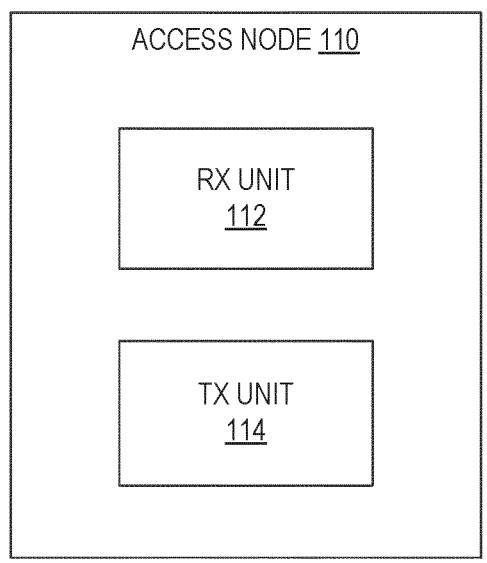
FIG. 20 illustrates an access node configured to perform the method of FIG. 16.

FIG. 20 illustrates an access node 110 (e.g., gNB or ng-eNB) configured to perform the method of FIG. 16. The access node 110 comprise a receiving (RX) unit 112 and a transmitting (TX) unit 114. The various units 112-114 can be implemented by hardware and/or by software code that is executed by one or more processors or processing circuits. The receiving unit 112 is configured to receive, from a connected mode UE 120, a RA message transmitted on 2-step RA resources in an inactive BWP configured for the UE 120. The transmitting unit 114 is configured to transmit, responsive to the RA message, a RA response to the UE 120.

Figure 21:
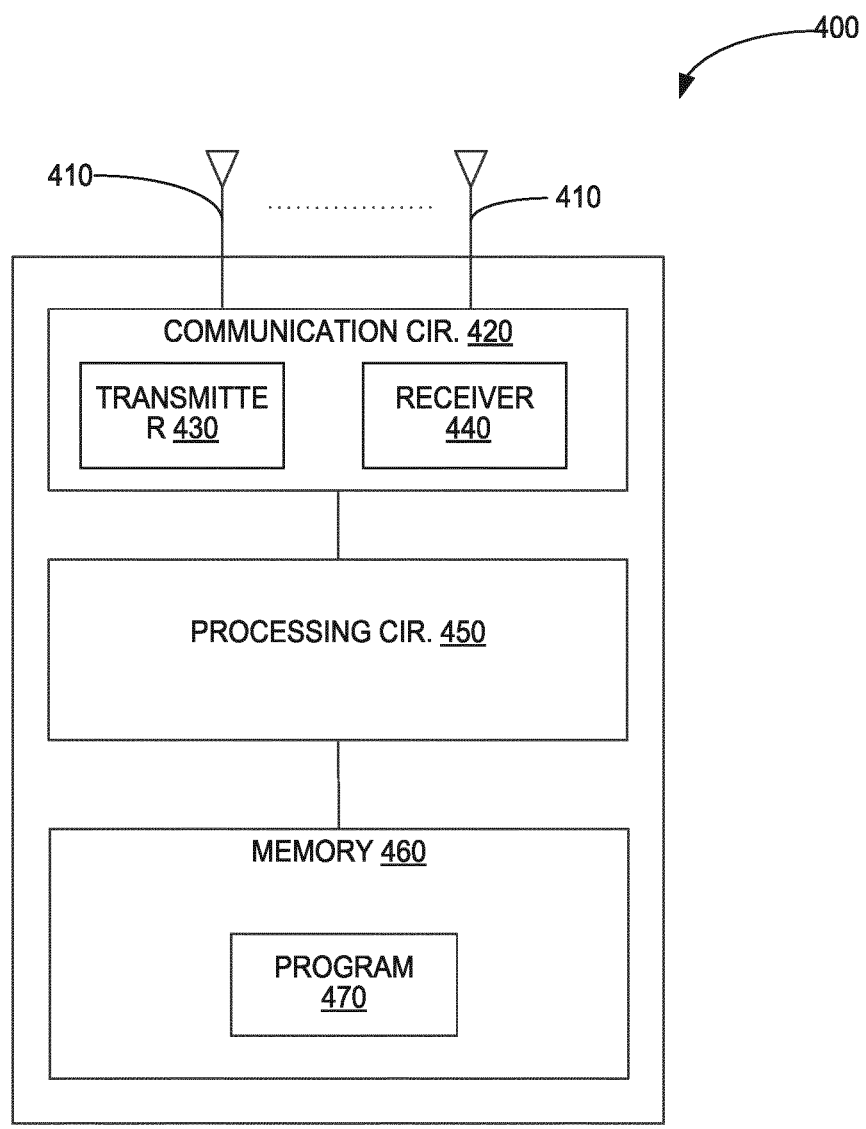
FIG. 21 illustrates the main functional components of a UE configured to perform the methods of FIGS. 13 and 14.

FIG. 21 illustrates the main functional components of a UE 400 configured to perform one or more of the methods shown in FIGS. 13 and 14. The UE 400 comprises one or more antennas 410, communication circuitry 420, processing circuitry 450, and memory 460.

The communication circuitry 420 is coupled to the antennas 410 and comprises the radio frequency (RF) circuitry (e.g., transmitter 430 and receiver 440) needed for transmitting and receiving signals over a wireless communication channel.

The processing circuitry 450 controls the overall operation of the radio UE 400 and is configured to perform one or more of the methods 200, 250 shown in FIGS. 13 and 14 as described herein. The processing circuitry 450 may comprise one or more microprocessors, hardware, firmware, or a combination thereof.

Memory 460 comprises both volatile and non-volatile memory for storing computer program code and data needed by the processing circuitry 470 for operation. Memory 460 may comprise any tangible, non-transitory computer-readable storage medium for storing data including electronic, magnetic, optical, electromagnetic, or semiconductor data storage. Memory 460 stores a computer program 470 comprising executable instructions that configure the processing circuitry 450 to implement one or more of the methods 200, 250 according to FIGS. 13 and 14 respectively. A computer program 470 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a RA memory (RAM). In some embodiments, computer program 470 for configuring the processing circuitry 450 as herein described may be stored in a removable memory, such as a portable compact disc, portable digital video disc, or other removable media. The computer program 470 may also be embodied in a carrier such as an electronic signal, optical signal, radio signal, or computer readable storage medium.

Figure 22:
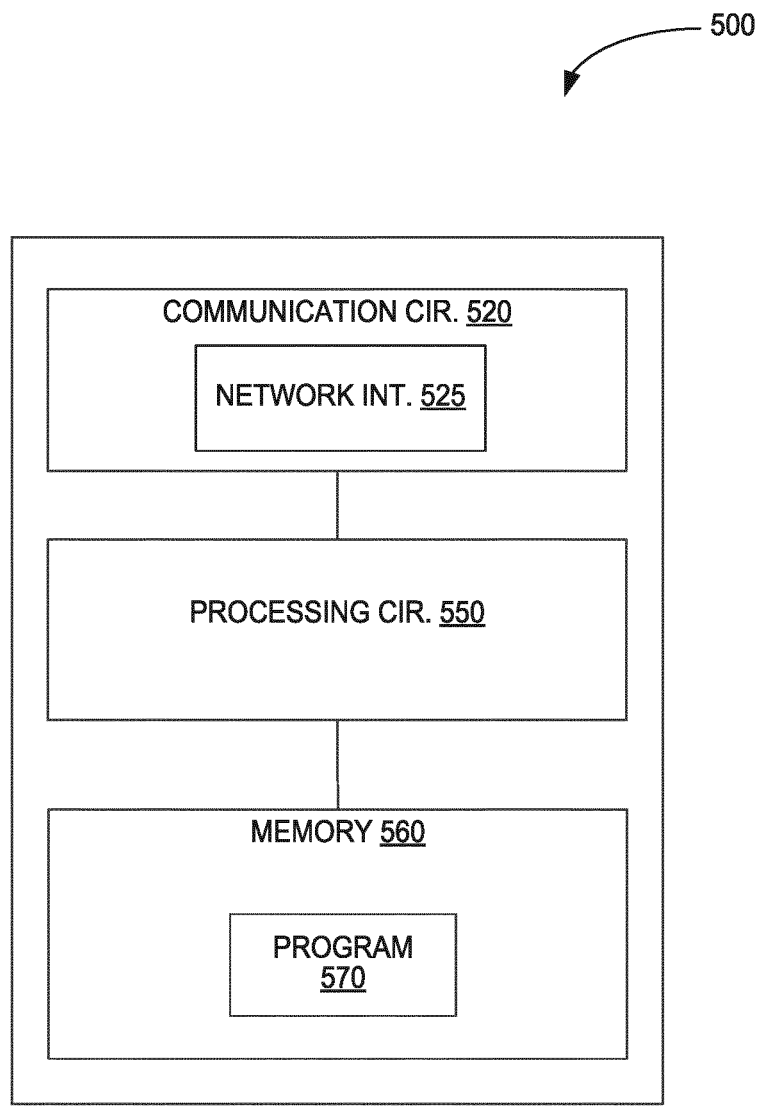
FIG. 22 illustrates the main functional components of a network node for configuring the UE to perform 2-step RA as herein described.

FIG. 22 illustrates the main functional components of a network node 500 for configuring the UE 400 according to an embodiment. The network node 500 comprises communication circuitry 620, processing circuitry 650, and memory 660.

The communication circuitry 520 comprise network interface circuitry 525 for enabling communication with other network nodes (e.g., access node 110 and other CN nodes) over wired or wireless interfaces, or both.

The processing circuitry 550 controls the overall operation of the network node 500 and is configured to perform the method 300 as shown in FIG. 15. The processing circuitry 550 may comprise one or more microprocessors, hardware, firmware, or a combination thereof.

Memory 560 comprises both volatile and non-volatile memory for storing computer program code and data needed by the processing circuitry 550 for operation. Memory 560 may comprise any tangible, non-transitory computer-readable storage medium for storing data including electronic, magnetic, optical, electromagnetic, or semiconductor data storage. Memory 560 stores a computer program 570 comprising executable instructions that configure the processing circuitry 550 to implement one or more of the method 300 shown in FIG. 15. A computer program 570 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a RA memory (RAM). In some embodiments, computer program 550 for configuring the processing circuitry 550 as herein described may be stored in a removable memory, such as a portable compact disc, portable digital video disc, or other removable media. The computer program 570 may also be embodied in a carrier such as an electronic signal, optical signal, radio signal, or computer readable storage medium.

Figure 23:
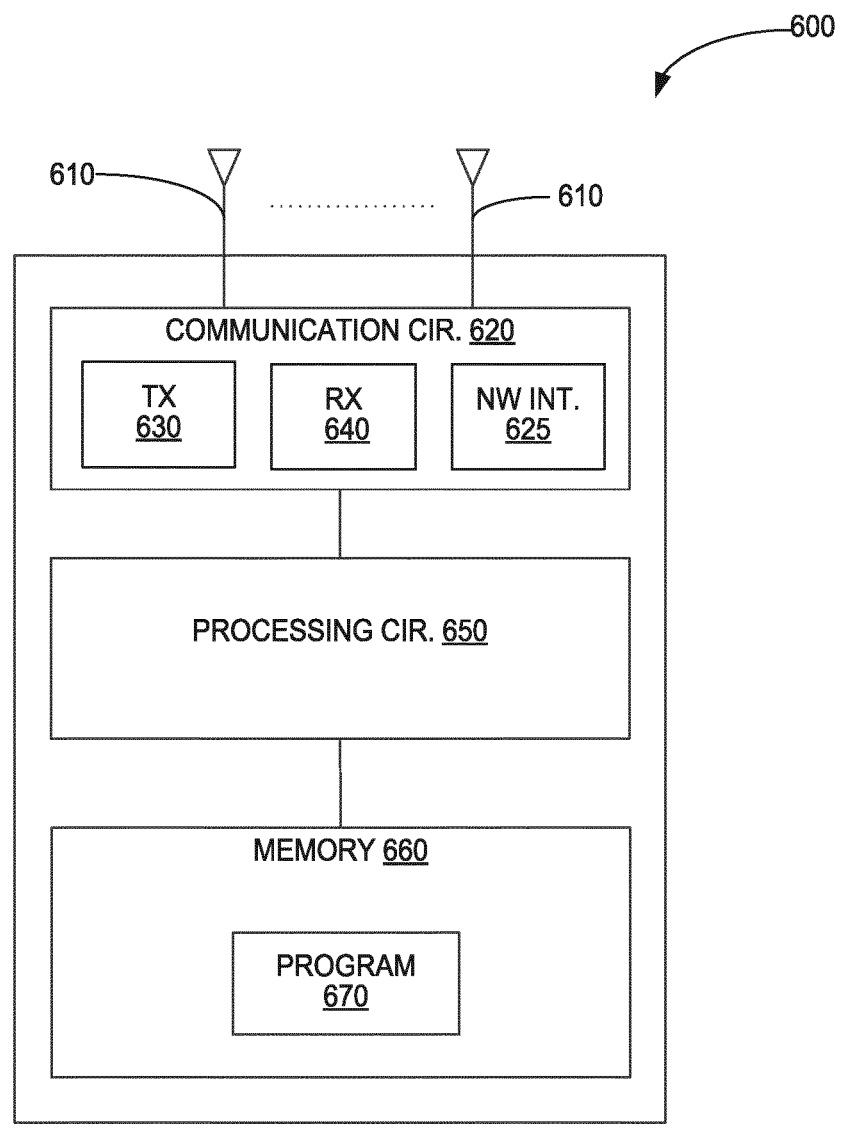
FIG. 23 illustrates the main functional components of an access node for configured to 2-step RA as herein described.

FIG. 23 illustrates an access node 600 according to another embodiment. The access node 600 comprises one or more antennas 610, communication circuitry 620, processing circuitry 650, and memory 660.

The communication circuitry 620 comprises the radio frequency (RF) circuitry (e.g., transmitter 630 and receiver 640) coupled to the antennas 610 for transmitting and receiving signals over a wireless communication channel. The communication circuitry 620 may further comprise network interface circuitry 625 for enabling communicating with other access nodes 110 in the 5G ran 103 or CN nodes in the 5GC 105 over wired or wireless interfaces, or both.

The processing circuitry 650 controls the overall operation of the access node 600 and is configured to perform the methods as herein described including one or more of the methods shown in FIGS. 15 and 16. The processing circuitry 650 may comprise one or more microprocessors, hardware, firmware, or a combination thereof.

Memory 660 comprises both volatile and non-volatile memory for storing computer program code and data needed by the processing circuitry 650 for operation. Memory 660 may comprise any tangible, non-transitory computer-readable storage medium for storing data including electronic, magnetic, optical, electromagnetic, or semiconductor data storage. Memory 660 stores a computer program 670 comprising executable instructions that configure the processing circuitry 650 to implement one or more of the methods 300, 350 shown in FIGS. 15 and 16 respectively. A computer program 670 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a RA memory (RAM). In some embodiments, computer program 650 for configuring the processing circuitry 650 as herein described may be stored in a removable memory, such as a portable compact disc, portable digital video disc, or other removable media. The computer program 670 may also be embodied in a carrier such as an electronic signal, optical signal, radio signal, or computer readable storage medium.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 24:
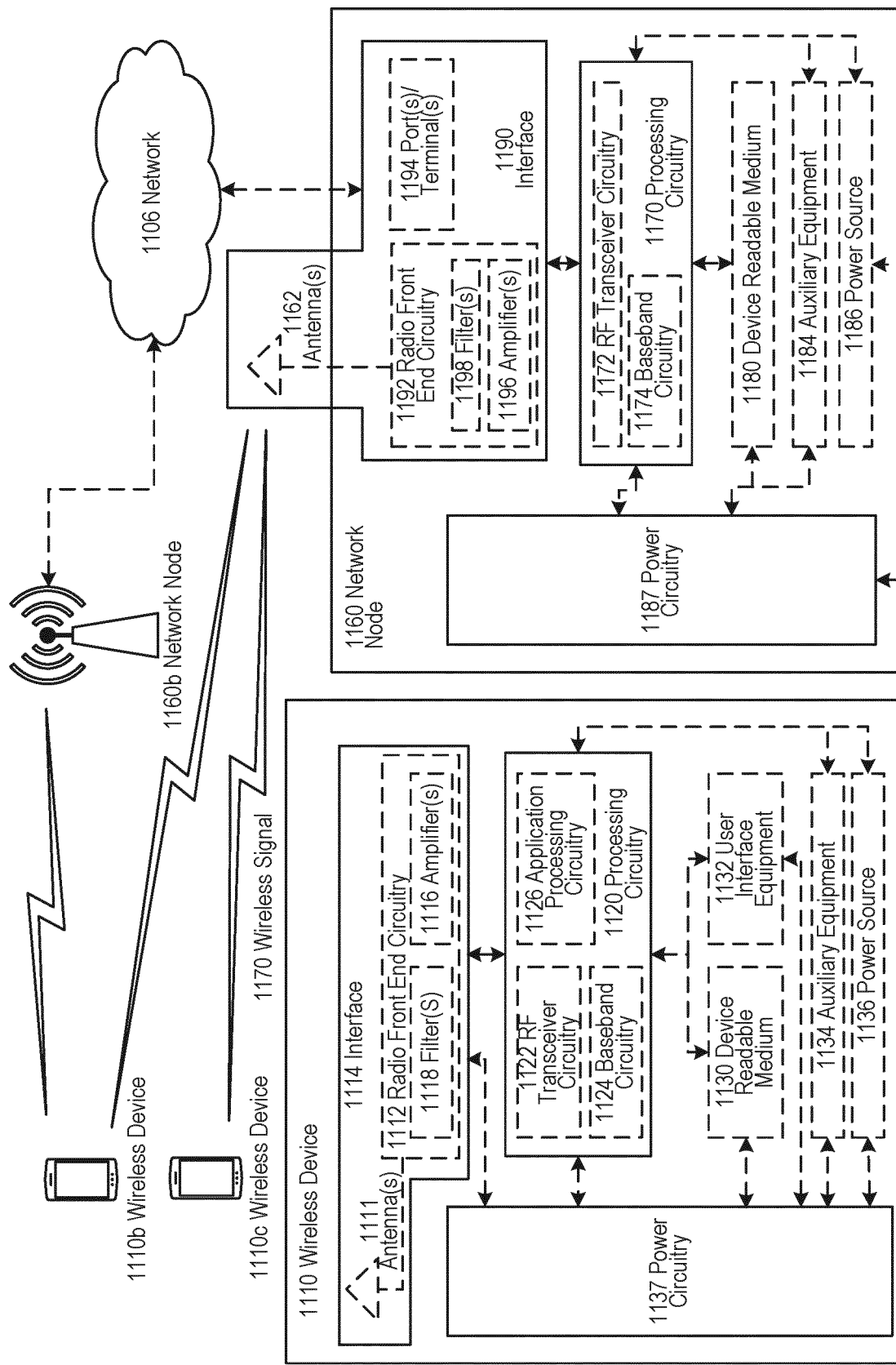
FIG. 24 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 24. For simplicity, the wireless network of FIG. 24 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 24, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 24 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196.

Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 24 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 25:
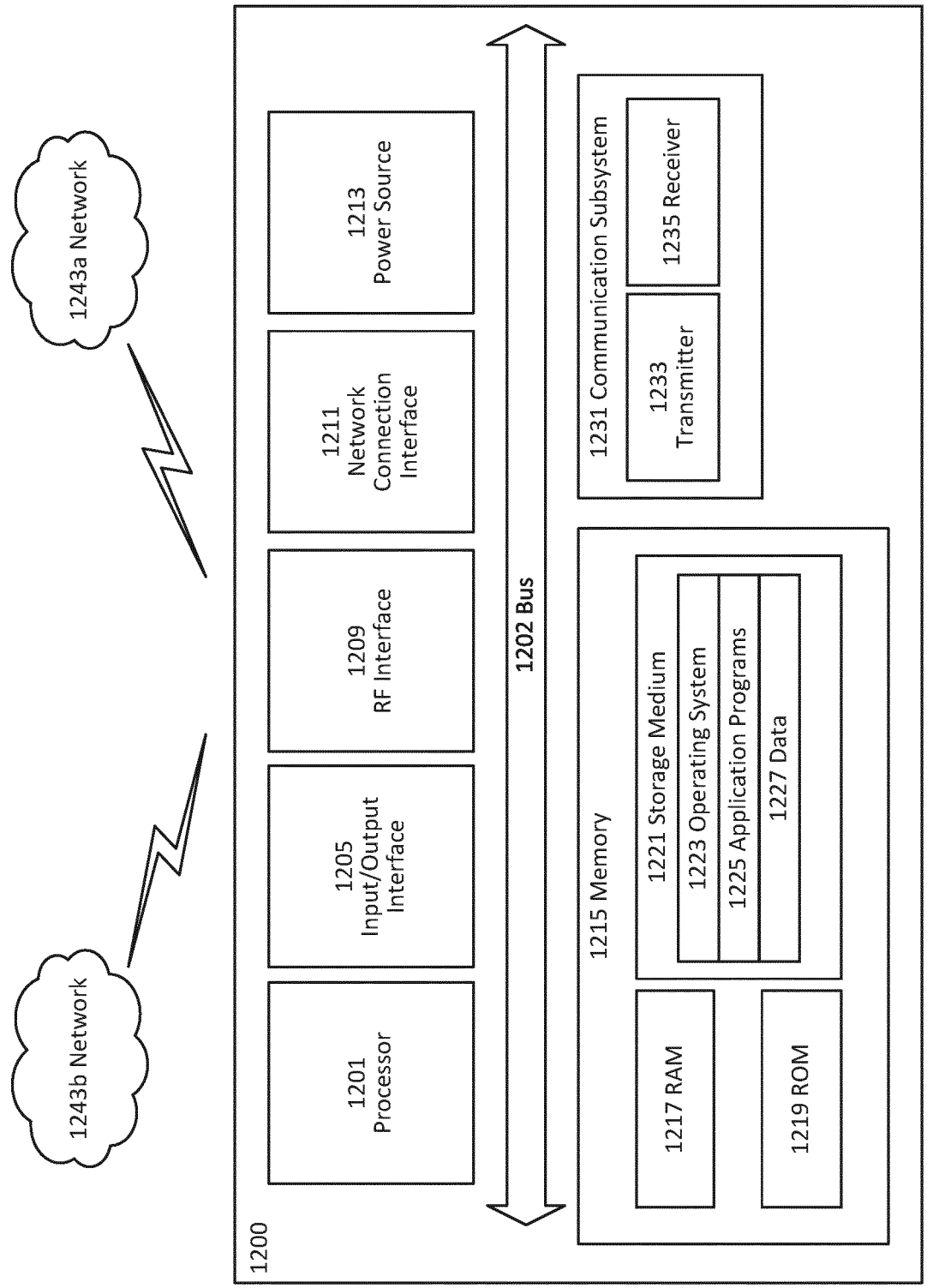
FIG. 25 is a schematic block diagram illustrating an example of a user equipment, according to particular embodiments of the present disclosure.

FIG. 25 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 25, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 25 is a UE, the components discussed herein are equally applicable to a WD, and vice-versa.

In FIG. 25, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 25, or only a subset of the components. The level of integration between the components may vary from one UE to another UE. Further, certain UEs may contain multiple instances of a component, such as multiple processors, memories, transceivers, transmitters, receivers, etc.

In FIG. 25, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 25, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 25, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.25, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 26:
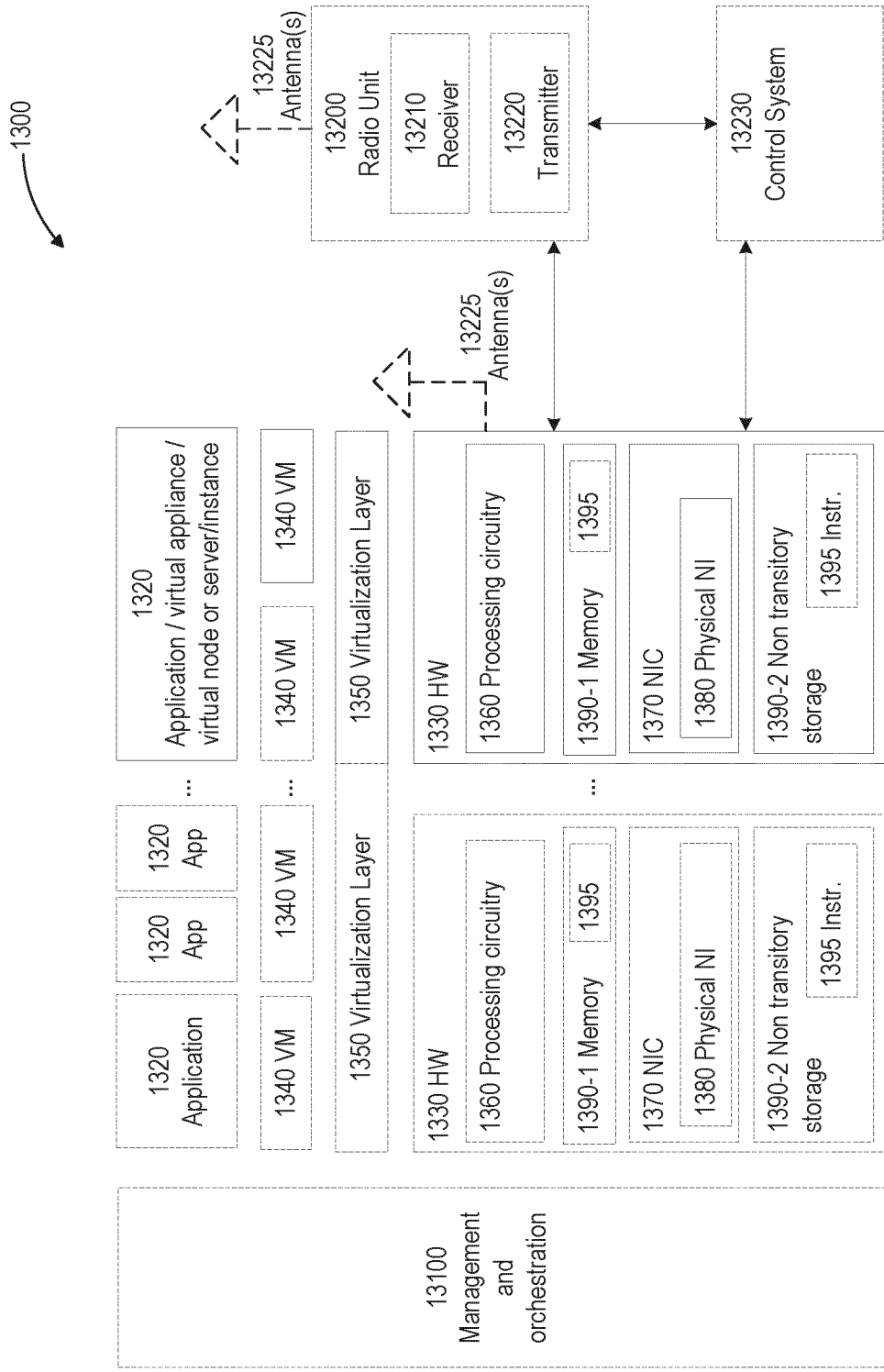
FIG. 26 is a schematic block diagram illustrating an example of a virtualization environment, according to particular embodiments of the present disclosure.

FIG. 26 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 26, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 26.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be affected with the use of control system 13230 which may alternatively be used for communication between the hardware nodes 1330 and radio units 13200.

Figure 27:
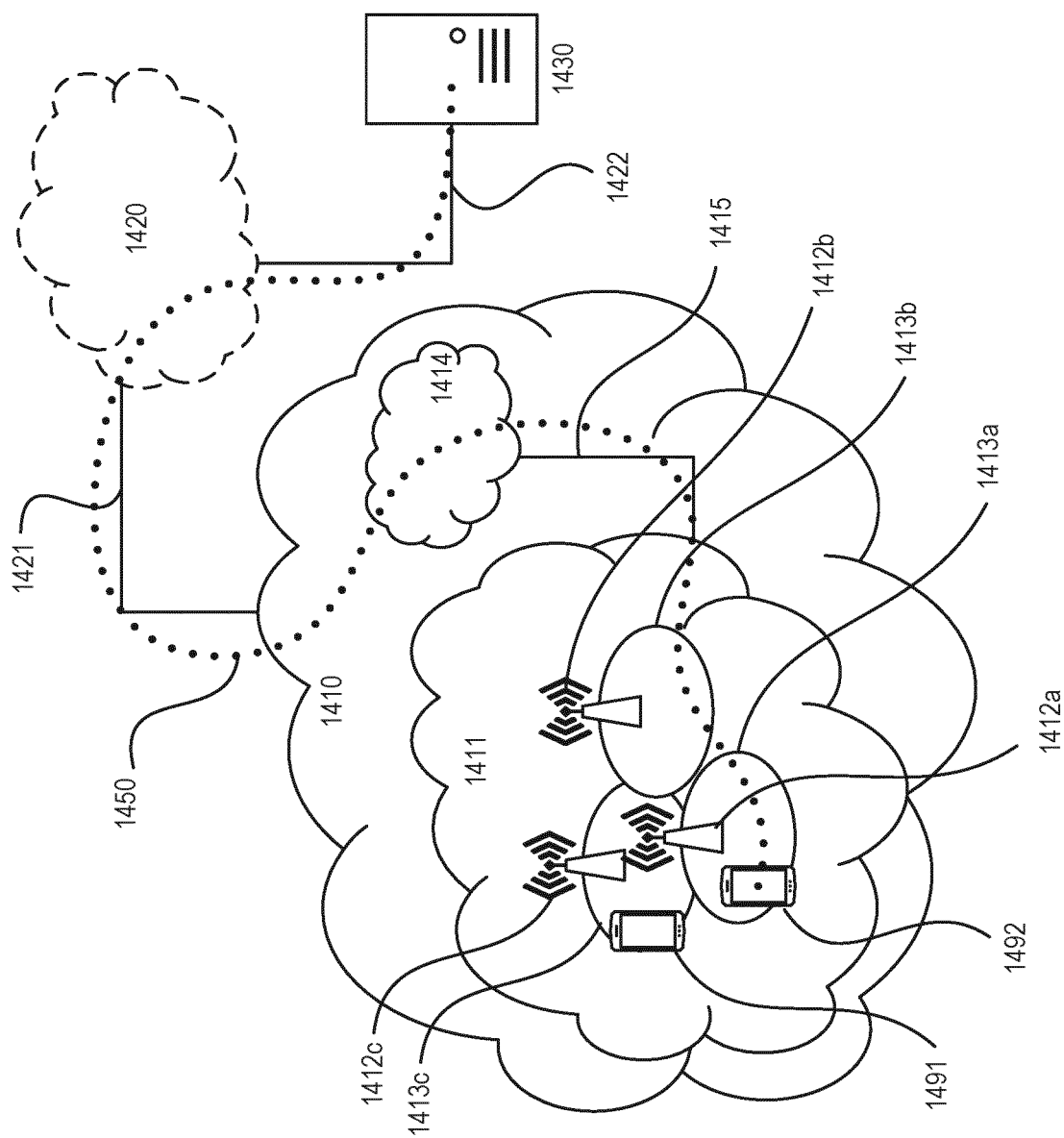
FIG. 27 is a schematic illustrating an example telecommunication network, according to particular embodiments of the present disclosure.

FIG. 27 illustrates a telecommunication network connected via an intermediate network to a host computer in accordance with some embodiments. In particular, with reference to FIG. 27, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 27 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 28:
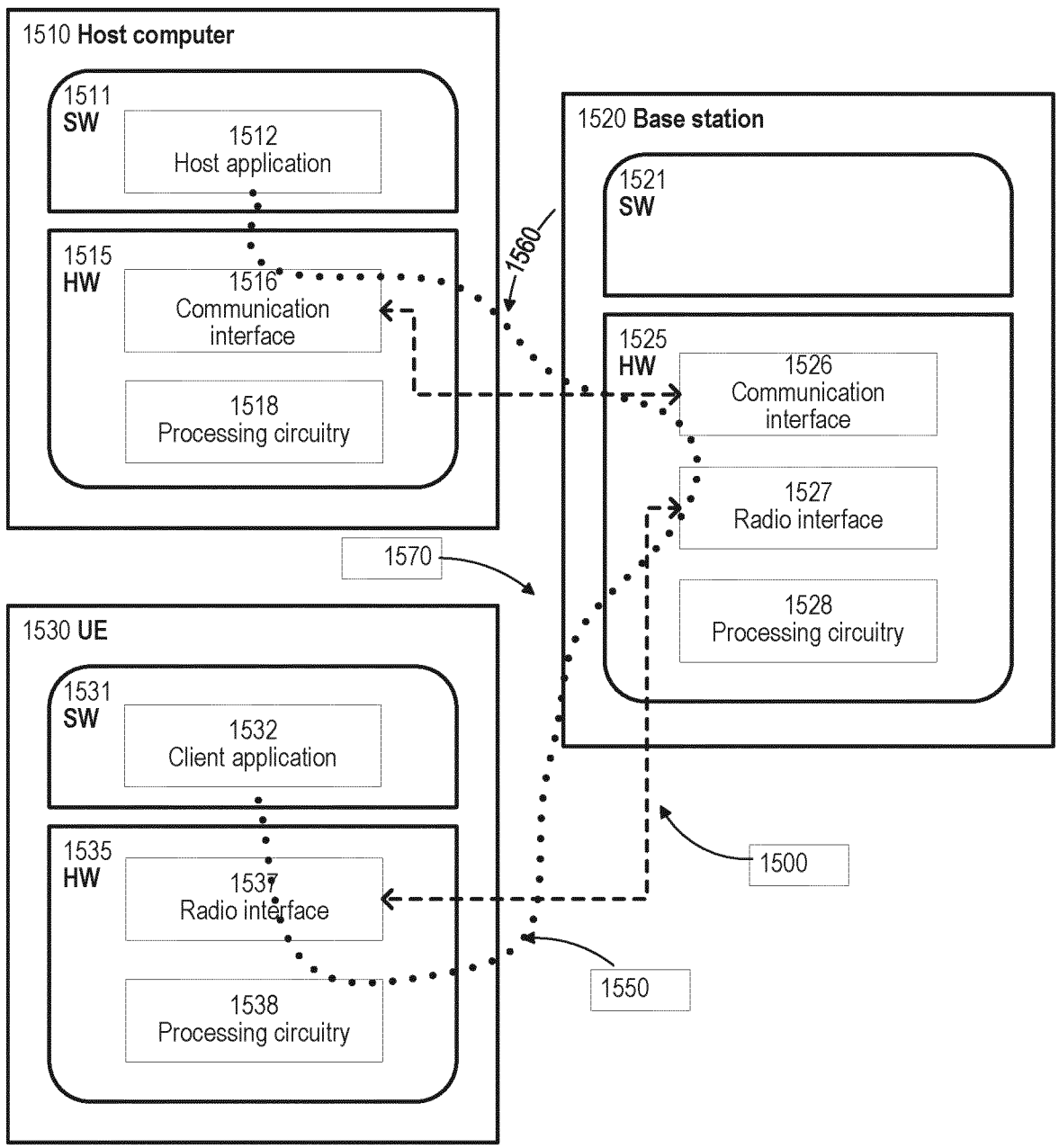
FIG. 28 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 28. FIG. 28 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 28) served by base station 1520. Communication interface 1526 may be configured to facilitate connection 1560 to host computer 1510. Connection 1560 may be direct or it may pass through a core network (not shown in FIG. 28) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 28 may be similar or identical to host computer 1430, one of base stations 1412a, 1412b, 1412c and one of UEs 1491, 1492 of FIG. 27, respectively. This is to say, the inner workings of these entities may be as shown in FIG. 28 and independently, the surrounding network topology may be that of FIG. 27.

In FIG. 28, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments provide greater flexibility in use of RA resources and thereby provide benefits such as lower signaling overhead, more efficient use of resources and greater spectral efficiency.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 29:
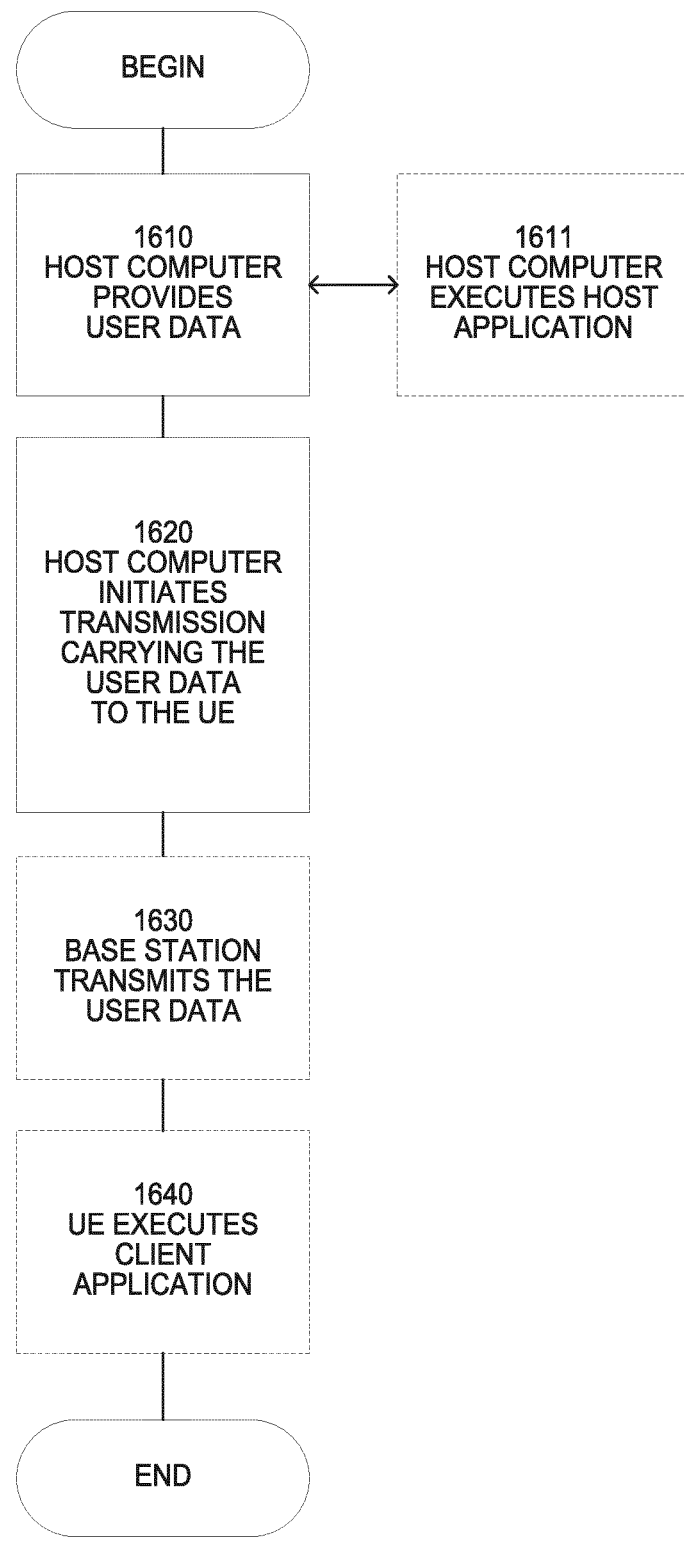
FIGS. 29-32 are flow diagrams, each of which illustrates an example method implemented in a communication system, according to particular embodiments of the present disclosure.

FIG. 29 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 29 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 30:
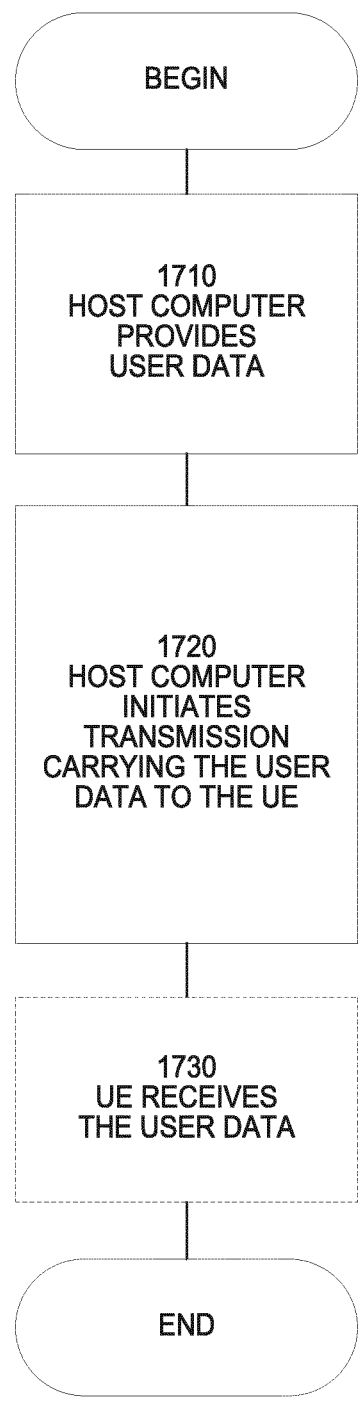

FIG. 30 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 30 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 31:
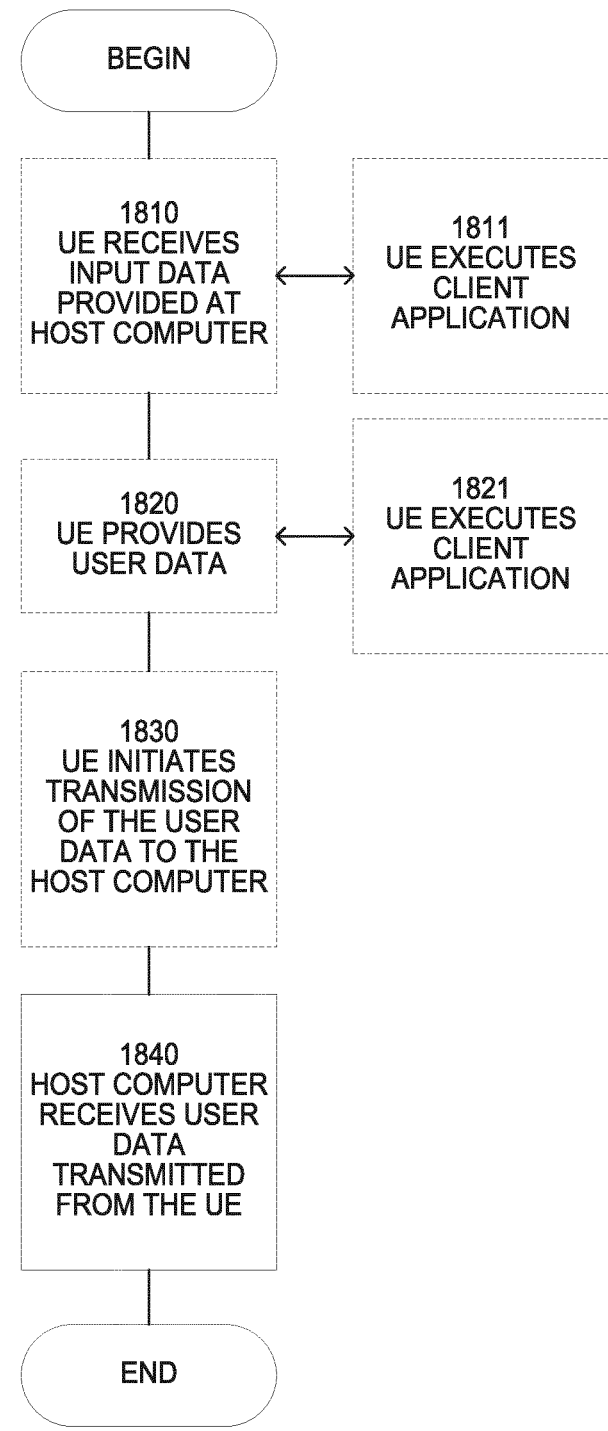

FIG. 31 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 31 will be included in this section. In step 1810 (which may be optional), the UE receives input data provided by the host computer. Additionally, or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 32:
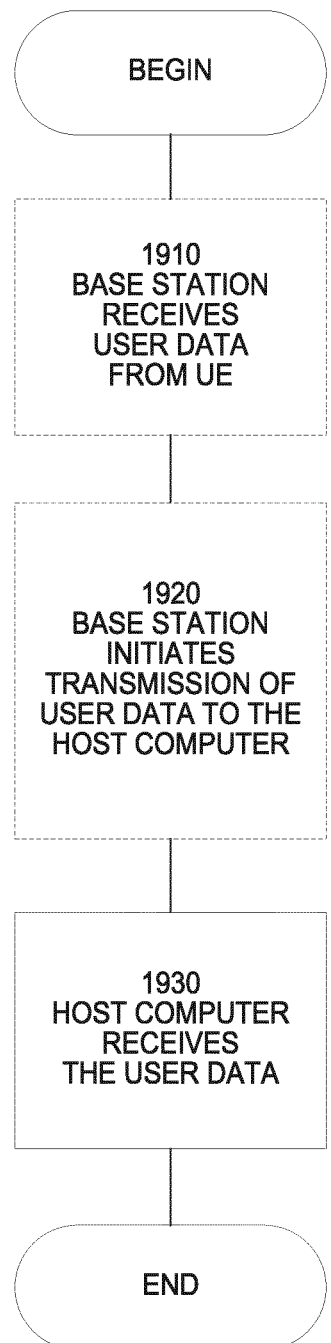

FIG. 32 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 32 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

EXEMPLARY EMBODIMENTS

Group A Embodiments

1. A method implemented by a user equipment (UE) in a wireless communication network, said method comprising:
   initiating a 2-step random access procedure while in a connected mode in an active bandwidth part (BWP); and
   transmitting a random access message to an access node on 2-step random access resources in an inactive BWP without changing the active BWP.
2. The method of embodiment 1 further comprising monitoring a search space in the inactive BWP for a RA response from the access node.
3. The method of embodiment 1 further comprising monitoring a search space in the active BWP for a RA response from the access node.
4. The method of embodiment 1 further comprising monitoring a common search space for the inactive BWP and the active BWP for a RA response from the access node.
5. The method of any one of embodiments 1-4 wherein, prior to transmitting, the UE selects RA resources from among first 2-step RA resources in the inactive BWP configured for the UE to use in both connected and idle/inactive modes and second 2-step RA resources in the active BWP overlapping the inactive BWP and configured for the UE to use in connected mode.
6. The method of embodiment 1 or 2 wherein the 2-step RA resources in the active BWP are in a non-overlapping portion of the active BWP.
7. The method of any one of embodiments 1-6 wherein a periodicity of PUSCH occasions for the active BWP and inactive BWP are different.
8. The method of embodiment 7 wherein the periodicity of PUSCH occasions for the active BWP is greater than the periodicity of the PUSCH occasions for the inactive BWP are different.
9. The method of embodiment 7 wherein the periodicity of PUSCH occasions for the active BWP is less than the periodicity of the PUSCH occasions for the inactive BWP are different.
10. The method of any one of embodiments 1-9 wherein the PUSCH occasions for the active BWP are offset in the time domain from PUSCH occasions for the inactive BWP.
11. The method of any one of embodiments 1-10 wherein the inactive BWP comprises an initial BWP configured for the UE or a default BWP configured for the UE.
12. A method implemented by a user equipment in a wireless communication network, said method comprising:
   initiating a 2-step random access procedure while in a connected mode in an active BWP;
   selecting 2-step random access (RA) resources from among first 2-step RA resources in an inactive BWP configured for the UE to use in both connected and idle/inactive modes and second 2-step RA resources in an active BWP overlapping the inactive BWP configured for the UE to use in connected mode; and
   transmitting a random access message in the inactive BWP without changing the active BWP.
13. The method of embodiment 12 wherein selecting 2-step RA resources comprises selecting the 2-step RA resources depending on a size of the RA message.
14. The method of embodiment 13 wherein the UE selects the 2-step RA resources in the inactive BWP when the RA resources in the active BWP are insufficient to transit the RA message.
15. The method of embodiment 12 selecting 2-step RA resources comprises selecting the 2-step RA resources depending on a priority of the RA message.
16. The method of embodiment 15 wherein the UE selects the 2-step RA resources in the inactive BWP for high priority RA messages.
17. The method of any one of embodiments 12-16 wherein the UE selects the 2-step RA resources in the inactive BWP based on or further based on a path loss between the UE and the access node.
18. The method of any one of embodiments 12-17 wherein a periodicity of PUSCH occasions for the active BWP and inactive BWP are different.
19. The method of embodiment 18 wherein the periodicity of PUSCH occasions for the active BWP is greater than the periodicity of the PUSCH occasions for the inactive BWP are different.
20. The method of embodiment 18 wherein the periodicity of PUSCH occasions for the active BWP is less than the periodicity of the PUSCH occasions for the inactive BWP are different.
21. The method of any one of embodiments 12-20 wherein the PUSCH occasions for the active BWP are offset in the time domain from PUSCH occasions for the inactive BWP.
22. The method of any one of embodiments 12-21 wherein the inactive BWP comprises an initial BWP configured for the UE or a default BWP configured for the UE.

Group B Embodiments

23. A method implemented by a network node in a wireless communication network of supporting random access, said method comprising:
   configuring 2-step RA resources for random access by the UE in connected mode including first 2-step RA resources in an inactive BWP for use in both connected and idle/inactive modes and second 2-step RA resources in an active BWP overlapping the inactive BWP configured for the UE to use in a connected mode.
24. The method of embodiment 23 wherein the network configures two or more inactive BWPs with 2-step RA resources that are overlapped by the active BWP.
25. The method embodiments 23 or 24 further comprising sending an indication whether UEs are allowed to use the PRACH resources of the inactive BWP to the access node.
26. The method of embodiment 25 wherein the indication specifies one or more purposes for which the 2-step resources in the inactive BWP can be used.
27. The method of embodiment 26 wherein the one or more purposes include at least one of a buffer status report, beam failure recovery, secondary cell (SCell) activation/deactivation, and high priority data.
28. The method of any one of embodiments 23-27 wherein the inactive BWP comprises an initial BWP or default BWP.
29. The method of any one of embodiments 23-28 wherein the 2-step RA resources for the active BWP are within the non-overlapping portion of the active BWP.
30. The method of any one of embodiments 23-29 wherein a periodicity of PUSCH occasions for the active BWP and inactive BWP are different.
31. The method of embodiment 30 wherein the periodicity of PUSCH occasions for the active BWP is greater than the periodicity of the PUSCH occasions for the inactive BWP are different.
32. The method of embodiment 30 wherein the periodicity of PUSCH occasions for the active BWP is less than the periodicity of the PUSCH occasions for the inactive BWP are different.
33. The method of any one of embodiments 23-32 wherein the PUSCH occasions for the active BWP are offset in the time domain from PUSCH occasions for the inactive BWP.
34. The method of any one of embodiments 23-33 wherein the inactive BWP comprises an initial BWP configured for the UE or a default BWP configured for the UE.
35. The method of any one of embodiments 23-34 wherein the network node comprises an access node.
36. A method implemented by an access node in a wireless communication network of supporting random access, said method comprising:

receiving, from a connected mode UE, a random access message transmitted on 2-step RA resources in an inactive BWP configured for the UE; and transmitting, responsive to the random access message, a random access response.

37. The method of embodiment 36 wherein the RA response is transmitted in a search space configured for the inactive BWP.

38 The method of embodiment 36 wherein the RA response is transmitted in a search space configured for the active BWP.

39. The method of embodiment 36 wherein the RA response is transmitted in a common search space configured for both the active and the inactive BWP.

40. The method of any one of embodiments 36-39 wherein the inactive BWP comprises an initial BWP configured for the UE or a default BWP configured for the UE.

Group C Embodiments

41. A user equipment in a wireless communication network, said user equipment being configured to:
initiate a 2-step random access procedure while in a connected mode in an active bandwidth part (BWP);
transmit a random access message to an access node on 2-step random access resources in an inactive BWP without changing the active BWP.

42. The user equipment of embodiment 41 configured to perform any one of the methods of embodiments 2-11.

43. A user equipment in a wireless communication network, said user equipment comprising:
communication circuitry configured for communication with one or more access nodes in the wireless communication network; and
processing circuitry configured to:
initiate a 2-step random access procedure while in a connected mode in an active bandwidth part (BWP);
transmit a random access message to an access node on 2-step random access resources in an inactive BWP without changing the active BWP.

44. The user equipment of embodiment 43 configured to perform any one of the methods of embodiments 2-11.

45. A user equipment in a wireless communication network, said user equipment being configured to:
initiate a 2-step random access procedure while in a connected mode in an active BWP;
select 2-step random access resources from among first 2-step random access resources in an inactive BWP configured for the UE to use in both connected and idle/inactive modes and second 2-step random access resources in an active BWP overlapping the inactive BWP configured for the UE to use in connected mode; and
transmit a random access message in the inactive BWP without changing the active BWP.

46. The user equipment of embodiment 45 configured to perform any one of the methods of embodiments 13-22.

47. A user equipment in a wireless communication network, said user equipment comprising:
communication circuitry configured for communication with one or more access nodes in the wireless communication network; and
processing circuitry configured to:
initiate a 2-step random access procedure while in a connected mode in an active BWP;
select 2-step random access resources from among first 2-step random access resources in an inactive BWP configured for the UE to use in both connected and idle/inactive modes and second 2-step random access resources in an active BWP overlapping the inactive BWP configured for the UE to use in connected mode; and
transmit a random access message in the inactive BWP without changing the active BWP.

48. The user equipment of embodiment 43 configured to perform any one of the methods of embodiments 13-22.

49. A computer program comprising executable instructions that, when executed by a processing circuit in a user equipment in a wireless communication network, causes the user equipment to perform any one of the methods of embodiments 1-22.

50. A carrier containing a computer program of embodiment 49, wherein the carrier is one of an electronic signal, optical signal, radio signal, or computer readable storage medium.

51. A non-transitory computer-readable storage medium containing a computer program comprising executable instructions that, when executed by a processing circuit in a user equipment in a wireless communication network causes the user equipment e to perform any one of the methods of embodiments 1-22.

52. A wireless device comprising:
processing circuitry configured to perform the method according to any one of embodiments 1-22; and
power supply circuitry configured to supply power to the wireless device.

53. A wireless device comprising:
processing circuitry and memory, the memory containing instructions executable by the processing circuitry whereby the wireless device is configured to perform the method according to any one of embodiments 1-22.

54. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform the method according to any one of embodiments 1-22;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

55. A computer program comprising instructions which, when executed by at least one processor of a wireless device, causes the wireless device to carry out the method according to any one of embodiments 1-22.

56. A carrier containing the computer program of embodiment 55, wherein the carrier is one of an electronic signal, optical signal, radio signal, or computer readable storage medium.

Group D Embodiments

57. A network node in a wireless communication network, said network node being operative to:

configure 2-step RA resources for random access by the UE in connected mode including first 2-step RA resources in an inactive BWP for use in both connected and idle/inactive modes and second 2-step RA resources in an active BWP overlapping the inactive BWP configured for the UE to use in a connected mode.

58. The network node of embodiment 57 configured to perform any one of the methods of embodiments 24-35.

59. A network node in a wireless communication network, said network node comprising:
communication circuitry enabling communication with other network nodes in the wireless communication network;
processing circuitry configured to:
configure 2-step RA resources for random access by the UE in connected mode including first 2-step RA resources in an inactive BWP for use in both connected and idle/inactive modes and second 2-step RA resources in an active BWP overlapping the inactive BWP configured for the UE to use in a connected mode.

60. The network node of embodiment 59 wherein the processing circuitry is further configured to perform any one of the methods of embodiments 24-35.

61. An access node in a wireless communication network, said network node being operative to:
receive, from a connected mode UE, a random access message transmitted on 2-step RA resources in an inactive BWP configured for the UE; and
transmit, responsive to the random access message, a random access response.

62. The access node of embodiment 57 configured to perform any one of the methods of embodiments 37-40.

63. An access node in a wireless communication network, said network node comprising:
communication circuitry enabling communication with other network nodes in the wireless communication network;
processing circuitry configured to:
receive, from a connected mode UE, a random access message transmitted on 2-step RA resources in an inactive BWP configured for the UE; and
transmit, responsive to the random access message, a random access response.

64. The access node of embodiment 59 wherein the processing circuitry is further configured to perform any one of the methods of embodiments 37-40.

65. A computer program comprising executable instructions that, when executed by processing circuitry in a network node in a wireless communication network, causes the network node to perform any one of the methods of embodiments 23-35

66. A carrier containing a computer program of embodiment 65, wherein the carrier is one of an electronic signal, optical signal, radio signal, or computer readable storage medium.

67. A non-transitory computer-readable storage medium containing a computer program comprising executable instructions that, when executed by processing circuitry in a network node in a wireless communication network causes the network node to perform any one of the methods of embodiments 23-35.

68. A computer program comprising executable instructions that, when executed by processing circuitry in an access node in a wireless communication network, causes the access node to perform any one of the methods of embodiments 36-40.

69. A carrier containing a computer program of embodiment 68, wherein the carrier is one of an electronic signal, optical signal, radio signal, or computer readable storage medium.

71. A non-transitory computer-readable storage medium containing a computer program comprising executable instructions that, when executed by processing circuitry in an access node in a wireless communication network causes the access node to perform any one of the methods of embodiments 36-40.

72. A base station comprising:
processing circuitry configured to perform the method of any one of embodiments 23-40;
power supply circuitry configured to supply power to the wireless device.

73. A base station comprising:
processing circuitry and memory, the memory containing instructions executable by the processing circuitry whereby the base station is configured to perform any of the method of any one of embodiments 23-40.

74. A computer program comprising instructions which, when executed by at least one processor of a base station, causes the base station to carry out the method of any one of embodiments 23-40.

75. A carrier containing the computer program of embodiment C10, wherein the carrier is one of an electronic signal, optical signal, radio signal, or computer readable storage medium.

Group E Embodiments

76. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the method of any one of embodiments 23-40.

77. The communication system of the pervious embodiment further including the base station.

78. The communication system of the previous 2 embodiments, further including the UE, wherein the UE is configured to communicate with the base station.

79. The communication system of the previous 3 embodiments, wherein:
the processing circuitry of the host computer is configured to execute a host application, thereby providing the user data; and
the UE comprises processing circuitry configured to execute a client application associated with the host application.

80. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the method of any one of embodiments 23-40.

81. The method of the previous embodiment, further comprising, at the base station, transmitting the user data.
82. The method of the previous 2 embodiments, wherein the user data is provided at the host computer by executing a host application, the method further comprising, at the UE, executing a client application associated with the host application.
83. A user equipment (UE) configured to communicate with a base station, the UE comprising a radio interface and processing circuitry configured to perform any of the previous 3 embodiments.
84. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the method of any one of embodiments 1-22.
85. The communication system of the previous embodiment, wherein the cellular network further includes a base station configured to communicate with the UE.
86. The communication system of the previous 2 embodiments, wherein:
the processing circuitry of the host computer is configured to execute a host application, thereby providing the user data; and
the UE's processing circuitry is configured to execute a client application associated with the host application.
87. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the method of any one of embodiments 1-22.
88. The method of the previous embodiment, further comprising at the UE, receiving the user data from the base station.
89. A communication system including a host computer comprising:
communication interface configured to receive user data originating from a transmission from a user equipment (UE) to a base station,
wherein the UE comprises a radio interface and processing circuitry, the UE's processing circuitry configured to perform any of the method of any one of embodiments 1-22.
90. The communication system of the previous embodiment, further including the UE.
91. The communication system of the previous 2 embodiments, further including the base station, wherein the base station comprises a radio interface configured to communicate with the UE and a communication interface configured to forward to the host computer the user data carried by a transmission from the UE to the base station.
92. The communication system of the previous 3 embodiments, wherein:
the processing circuitry of the host computer is configured to execute a host application; and
the UE's processing circuitry is configured to execute a client application associated with the host application, thereby providing the user data.
93. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
94. A method implemented in a communication system including a host computer, a base station and a user equipment (UE), the method comprising:
at the host computer, receiving user data transmitted to the base station from the UE,
wherein the UE performs any of the method of any one of embodiments 1-22.
95. The method of the previous embodiment, further comprising, at the UE, providing the user data to the base station.
96. The method of the previous 2 embodiments, further comprising:
at the UE, executing a client application, thereby providing the user data to be transmitted; and
at the host computer, executing a host application associated with the client application.
97. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
98. A communication system including a host computer comprising a communication interface configured to receive user data originating from a transmission from a user equipment (UE) to a base station, wherein the base station comprises a radio interface and processing circuitry, the base station's processing circuitry configured to perform any of the method of any one of embodiments 23-40.
99. The communication system of the previous embodiment further including the base station.
100. The communication system of the previous 2 embodiments, further including the UE, wherein the UE is configured to communicate with the base station.
101. The communication system of the previous 3 embodiments, wherein:
the processing circuitry of the host computer is configured to execute a host application;
the UE is configured to execute a client application associated with the host application, thereby providing the user data to be received by the host computer.
102. A method implemented in a communication system including a host computer, a base station and a user equipment (UE), the method comprising:
at the host computer, receiving, from the base station, user data originating from a transmission which the base station has received from the UE, wherein the UE performs any of the method of any one of embodiments 1-22.

103. The method of the previous embodiment, further comprising at the base station, receiving the user data from the UE.

104. The method of the previous 2 embodiments, further comprising at the base station, initiating a transmission of the received user data to the host computer.

What is claimed is:

1. A method implemented by a user equipment (UE) in a wireless communication network, said method comprising:
configuring first 2-step random access resources in an inactive bandwidth part (BWP) to use in both connected and idle/inactive modes:
configuring second 2-step random access resources in an active BWP overlapping the inactive BWP and configured for the UE to use in connected mode;
initiating a 2-step random access procedure while in a connected mode in the active bandwidth part BWP; and
transmitting a random access message to an access node on the first 2-step random access resources configured for the inactive BWP without changing the active BWP.

2. The method of claim 1, further comprising monitoring a search space in the active BWP, a search space for the inactive BWP, or a common search space for both the active BWP and inactive BWP for a random access response from the access node.

3. The method of claim 1, further comprising monitoring a common search space for the inactive BWP and the active BWP for a random access response from the access node.

4. The method of claim 1, wherein a periodicity of Physical Uplink Shared Channel (PUSCH) occasions for the active BWP and inactive BWP are different.

5. The method of claim 1, wherein the inactive BWP comprises an initial BWP configured for the UE or a default BWP configured for the UE.

6. The method of claim 1, further comprising selecting the first 2-step random access resources for the transmission of the ransom access message depending on at least one of:
a size of the random access message;
a priority of the random access message; and
a path loss between the UE and the access node.

7. A user equipment in a wireless communication network, said user equipment comprising:
communication circuitry configured for communication with an access node;
processing circuitry configured to:
configure first 2-step random access resources in an inactive bandwidth part (BWP) to use in both connected and idle/inactive modes;
configure second 2-step random access resources in an active BWP overlapping the inactive BWP and configured for the UE to use in connected mode;
initiate a 2-step random access procedure while in a connected mode in the active BWP;
transmit a random access message to an access node on the first 2-step random access resources configured for the inactive BWP without changing the active BWP.

8. The user equipment of claim 7 being further configured to:
select the first 2-step random access resources for the transmission of the random access message depending on at least one of:
a size of the random access message;
a priority of the random access message; and
a path loss between the UE and the access node.

9. The method of claim 8 further comprising:
receiving, from a connected mode UE, a random access message transmitted on 2-step random access resources in an inactive bandwidth part (BWP) configured for the UE; and
transmitting, responsive to the random access message, a random access response.

10. A method implemented by a network node in a wireless communication network of supporting random access, said method comprising:
configuring 2-step random access resources for random access by the UE in connected mode including first 2-step random access resources in an inactive bandwidth part (BWP) for use in both connected and idle/inactive modes and second 2-step random access resources in an active BWP overlapping the inactive BWP configured for the UE to use in a connected model; and
sending an indication whether UEs are allowed to use the random access resources of the inactive BWP to the access node.

11. The method of claim 10, wherein the indication specifies one or more purposes for which the 2-step resources in the inactive BWP can be used.

12. The method of claim 10, wherein the inactive BWP comprises an initial BWP or default BWP.

13. The method of claim 10, wherein the 2-step random access resources for the active BWP are within the non-overlapping portion of the active BWP.

14. The method of claim 10, wherein a periodicity of Physical Uplink Shared Channel (PUSCH) occasions for the active BWP and inactive BWP are different.

15. A network node in a wireless communication network, said network node comprising:
communication circuitry configured for communication with user equipment and/or other network nodes;
processing circuitry configured to:
configure 2-step random access resources for random access by the UE in connected mode including first 2-step random access resources in an inactive bandwidth part (BWP) for use in both connected and idle/inactive modes and second 2-step random access resources in an active BWP overlapping the inactive BWP configured for the UE to use in a connected mode; and
sending an indication whether UEs are allowed to use the random access resources of the inactive BWP to the access node.

16. The network node of claim 15, wherein the processing circuitry is further configured to:
receive, from a connected mode UE, a random access message transmitted on 2-step random access resources in an inactive BWP configured for the UE; and
transmit, responsive to the random access message, a random access response.

* * * * *